US012657045B2

(12) United States Patent
Wang et al.

(10) Patent No.: US 12,657,045 B2
(45) Date of Patent: Jun. 16, 2026

(54) VIRTUAL MACHINE MEMORY MANAGEMENT METHOD AND DEVICE

(71) Applicant: HUAWEI TECHNOLOGIES CO., LTD., Shenzhen (CN)

(72) Inventors: Zhigang Wang, Hangzhou (CN); Yifei Jiang, Hangzhou (CN); Jian Ma, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 644 days.

(21) Appl. No.: 17/656,699

(22) Filed: Mar. 28, 2022

(65) Prior Publication Data

US 2022/0214907 A1 Jul. 7, 2022

Related U.S. Application Data

(63) Continuation of application No. PCT/CN2020/114446, filed on Sep. 10, 2020.

(30) Foreign Application Priority Data

Sep. 29, 2019 (CN) .......................... 201910953083.9

(51) Int. Cl.
*G06F 9/455* (2018.01)
*G06F 11/07* (2006.01)
(52) U.S. Cl.
CPC ........ *G06F 9/45558* (2013.01); *G06F 11/073* (2013.01); *G06F 2009/45583* (2013.01)
(58) Field of Classification Search
CPC .............. G06F 9/45558; G06F 11/073; G06F 2009/45583
See application file for complete search history.

(56) References Cited

U.S. PATENT DOCUMENTS 10,346,313 B1 * 7/2019 Emelyanov ........... G06F 12/123
711/206
2004/0054994 A1 3/2004 Demsey et al.
(Continued)

FOREIGN PATENT DOCUMENTS

CN 103430159 A 12/2013
CN 103605613 A 2/2014
(Continued)

OTHER PUBLICATIONS

Anonymous T E: "Understanding Memory Resource Management in VMware ESX Server," Sep. 9, 2009, XP093389932, total 20 pages.

*Primary Examiner* — Aimee Li
*Assistant Examiner* — Harrison Li
(74) *Attorney, Agent, or Firm* — WOMBLE BOND DICKINSON (US) LLP

(57) ABSTRACT

A virtual machine memory management method and device are provided. The method includes: identifying memory of a non-operating system of a virtual machine from total memory allocated to the virtual machine, where the total memory includes memory of the virtual machine and management memory of a hypervisor, and the memory of the virtual machine includes memory of an operating system of the virtual machine and the memory of the non-operating system of the virtual machine; using the memory of the non-operating system of the virtual machine as swappable memory; and storing data in the swappable memory into a nonvolatile memory. This method helps avoid a problem that computer performance significantly deteriorates in a virtual machine over-submission scenario, and improve stability in running of a virtual machine and users' use experience.

17 Claims, 13 Drawing Sheets

(56)             References Cited

U.S. PATENT DOCUMENTS

2005/0235123 A1*  10/2005  Zimmer ................ G06F 9/5016
                                                                711/170
2009/0070776 A1    3/2009  Dahlstedt
2009/0172639 A1    7/2009  Natu et al.
2013/0031292 A1    1/2013  Van Riel
2015/0161055 A1*   6/2015  Deguillard ............. G06F 9/455
                                                                711/6
2016/0110291 A1    4/2016  Gordon et al.
2017/0344298 A1   11/2017  Shih et al.
2019/0391851 A1*  12/2019  Franciosi ............. G06F 9/5077
                                                                718/1
2020/0218573 A1*   7/2020  Sun ....................... G06F 9/5016
                                                                711/170

FOREIGN PATENT DOCUMENTS

CN          104216837  A    12/2014
CN          104571955  A     4/2015
CN          104915151  A     9/2015
CN          107273212  A    10/2017
CN          107341060  A    11/2017
CN          107463430  A    12/2017
CN          109885381  A     6/2019

* cited by examiner

Guest OS:   guest operating system
Hypervisor: hypervisor
Normal:     normal

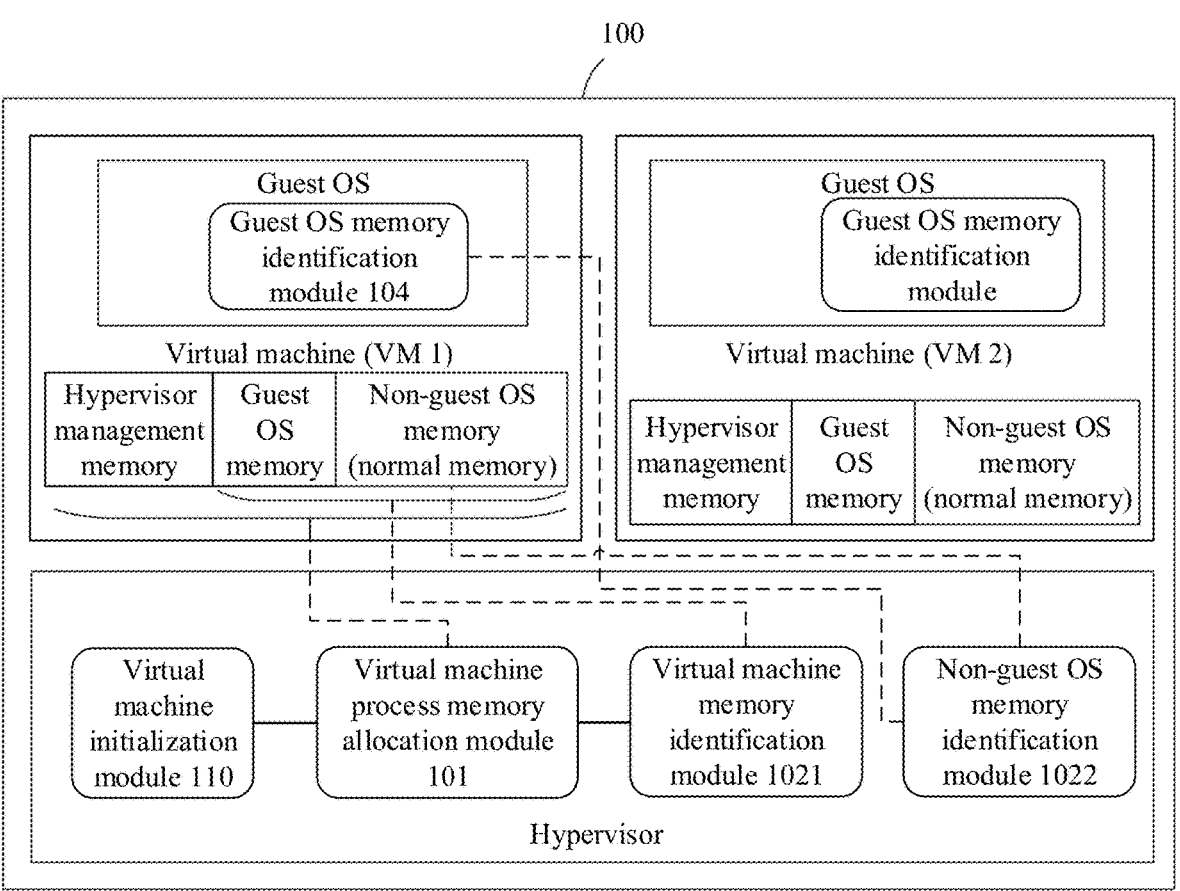

100

Guest OS

Guest OS memory
identification
module 104

Virtual machine (VM 1)

| Hypervisor management memory | Guest OS memory | Non-guest OS memory (normal memory) |

Guest OS

Guest OS memory
identification
module

Virtual machine (VM 2)

| Hypervisor management memory | Guest OS memory | Non-guest OS memory (normal memory) |

Virtual
machine
initialization
module 110

Virtual machine
process memory
allocation module
101

Virtual machine
memory
identification
module 1021

Non-guest OS
memory
identification
module 1022

Hypervisor

Guest OS:   guest operating system
Hypervisor: hypervisor
Normal:      normal

FIG. 7

Guest OS:   guest operating system
Hypervisor: hypervisor
Normal:     normal

Guest OS:   guest operating system
Hypervisor: hypervisor
Normal:     normal

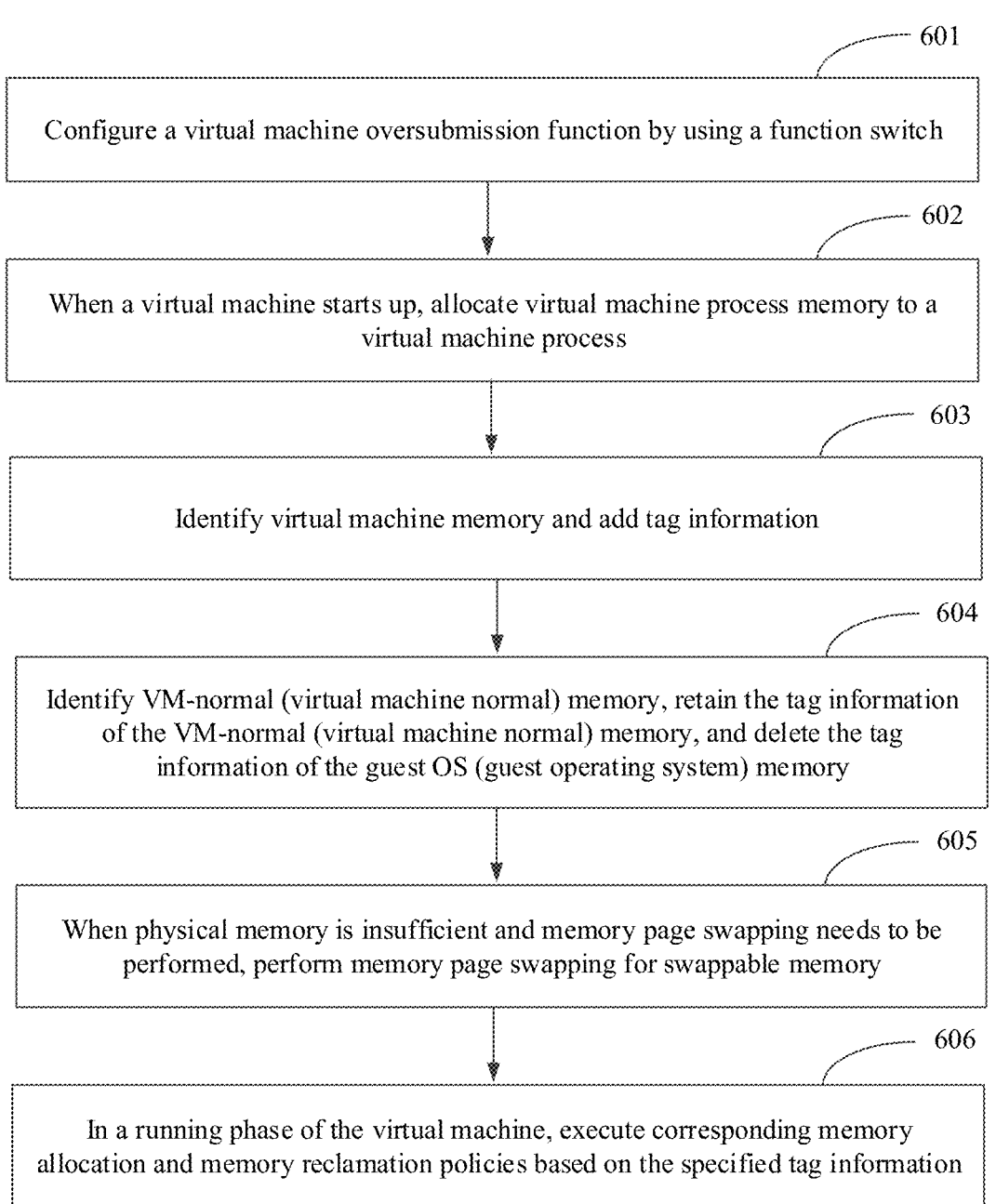

601

Configure a virtual machine oversubmission function by using a function switch

602

When a virtual machine starts up, allocate virtual machine process memory to a virtual machine process

603

Identify virtual machine memory and add tag information

604

Identify VM-normal (virtual machine normal) memory, retain the tag information of the VM-normal (virtual machine normal) memory, and delete the tag information of the guest OS (guest operating system) memory

605

When physical memory is insufficient and memory page swapping needs to be performed, perform memory page swapping for swappable memory

606

In a running phase of the virtual machine, execute corresponding memory allocation and memory reclamation policies based on the specified tag information

VIRTUAL MACHINE MEMORY MANAGEMENT METHOD AND DEVICE

CROSS-REFERENCE TO RELATED APPLICATIONS

This application is a continuation of International Application No. PCT/CN2020/114446, filed on Sep. 10, 2020, which claims priority to Chinese Patent Application No. 201910953083.9, filed on Sep. 29, 2019. The disclosures of the aforementioned applications are hereby incorporated by reference in their entireties.

TECHNICAL FIELD

This application relates to the field of virtual machine technologies, and in particular, to a virtual machine memory management method and device.

BACKGROUND

A virtualization technology is a core technology of a cloud scenario. In a system with a plurality of virtual machines (VM) deployed, the plurality of virtual machines share physical resources of a same physical host (PM), for example, a processor, memory, a magnetic disk, and a network device. In this way, physical resources of one physical host can be shared by a plurality of users at a per-VM granularity, so that the plurality of users can conveniently and flexibly use the physical resources on a premise of safe isolation, greatly improving utilization of the physical resources.

In the virtualization technology, memory allocated to each virtual machine is fixed. In a cloud computing platform, memory usage is relatively low from perspectives of both a virtual machine and a physical host. For example, memory usage of a single physical host is only 40% on average. An increase in a quantity of virtual machines of a same physical host can effectively improve virtual machine density and physical memory usage of a single physical host. In a virtual machine over-submission scenario, to ensure performance and service quality of each virtual machine, a hypervisor dynamically allocates memory resources to each virtual machine based on constantly changing external load of the virtual machine. Because peak load hours of different virtual machines may vary, physical memory is abundant most of the time. However, in some circumstances, actual required memory may be greater than the physical memory.

When the physical memory is insufficient, part of storage space of a hard disk may be used as memory, and of all memory allocated to a virtual machine, an operating system selects and stores part of content into a magnetic disk. Because a magnetic disk access speed is usually several orders of magnitude lower than a memory access speed, computer performance significantly deteriorates when the part of content needs to be used, greatly affecting users' use experience.

SUMMARY

Embodiments of this application provide a virtual machine memory management method and device, to help avoid a problem that computer performance significantly deteriorates in a virtual machine over-submission scenario, and improve stability in running of a virtual machine and users' use experience.

According to a first aspect, an embodiment of this application provides a virtual machine memory management method. The method includes: identifying memory of a non-operating system of a virtual machine (VM) from total memory allocated to the virtual machine, where the total memory includes memory of the virtual machine and memory of a hypervisor, the memory of the virtual machine is used to store code of the virtual machine and data generated during running of the virtual machine, the management memory of the hypervisor is used to store data required for the hypervisor to manage running of the virtual machine, the memory of the virtual machine includes memory of an operating system of the virtual machine and the memory of the non-operating system of the virtual machine, the memory of the operating system of the virtual machine is used to store code and data of the operating system of the virtual machine, and the memory of the non-operating system of the virtual machine is memory other than the memory of the operating system of the virtual machine in the memory of the virtual machine; identifying the memory of the non-operating system of the virtual machine from the total memory; using the memory of the non-operating system of the virtual machine as swappable memory, where the swappable memory represents memory for which memory swapping is allowed; and storing data in the swappable memory into a nonvolatile memory.

In other words, when the virtual machine starts up, an operating system of a physical host (Host OS) allocates a memory specification (that is, a size of the total memory) of the virtual machine to the virtual machine. The memory specification indicates the size of the total memory that is allowed to be applied for by the virtual machine for use. The memory specification covers a size of the memory of the virtual machine and a size of the management memory of the hypervisor. The size of the memory of the virtual machine is a size of memory provided for the virtual machine to apply for, and the size of the management memory of the hypervisor is a size of memory provided for the hypervisor to apply for. For example, the allocated memory specification is 4 gigabytes (GB), where the size of the memory of the virtual machine is 3.5 GB, and the size of the management memory of the hypervisor is 0.5 GB. Certainly, the example herein is merely used to explain this application rather than to limit it. In this case, no storage space of the size of the memory specification (for example, the memory specification is 3 GB) is actually allocated to the virtual machine from physical memory. An actual case is as follows: When the memory of the virtual machine and the management memory of the hypervisor are actually accessed, a mapping relationship between the memory of the virtual machine and memory pages in the physical memory and a mapping relationship between the management memory of the hypervisor and memory pages in the physical memory are then established based on the applications.

The memory of the virtual machine covers the memory of the operating system of the virtual machine and the memory of the non-operating system of the virtual machine. In this specification, the operating system of the virtual machine may also be referred to as a guest operating system (Guest OS). A size of the memory of the guest OS is a size of memory provided for the guest OS to apply for. Correspondingly, the non-operating system of the virtual machine in this specification may be referred to as a non-guest OS. The memory of the non-guest OS is memory other than the memory of the guest OS in the memory of the virtual machine. For example, the size of the memory of the virtual machine is 3.5 GB, where the size of the memory of the guest OS is 1 GB, and a size of the memory of the non-guest OS is 2.5 GB. Certainly, the example herein is merely used to explain this application rather than to limit it. For example, the memory of the non-guest OS may be provided for an application program in the guest OS to apply for. In other words, the memory of the non-guest OS may be used to store code and data of an application program.

The data stored in the management memory of the hypervisor may include, for example, data structures describing various hardware devices (devices such as a CPU, memory, a network adapter, a magnetic disk, and a graphics card), management information of each hardware device, and the like. The CPU (that is, central processing unit, central processing unit) is used as an example. Information including a quantity of CPUs, a description of a simulated CPU hardware architecture, and the like is recorded in the management information of the CPU. The data stored in the management memory of the hypervisor may further include, for example, buffered data such as buffered data for display and buffered data for input/output (IO). The hypervisor may be used to coordinate shared access performed by virtual machines to these hardware devices such as the memory, the CPU, the network adapter, and the magnetic disk. When the virtual machines start up, each virtual machine has data that needs to be stored, such as a corresponding data structure and buffered data. Therefore, to create the virtual machine, the allocated memory specification needs to cover the size of the memory of the virtual machine and the size of the management memory of the hypervisor.

The memory of the operating system of the virtual machine is used to store the code and data of the operating system of the virtual machine. The data stored in the memory of the operating system of the virtual machine may be, for example, a compilation library, stack data required for running an application program, data required during running of a kernel module of the guest OS, and the like.

The memory of the non-operating system of the virtual machine may be used to store, for example, relevant code and data of various application programs running on the guest OS. Specific data of the application programs may include, for example, data that is of a database program and that is loaded into memory, data of a file opened by a word processing program, and the like.

In this specification, for ease of description, in some cases, the total memory allocated to the VM is also referred to as "virtual machine process memory" for short, the management memory of the hypervisor is also referred to as "hypervisor management memory" for short, the memory of the VM is also referred to as "virtual machine memory" for short, the memory of the operating system of the VM is also referred to as "guest OS memory" for short, and the memory of the non-operating system of the VM is also referred to as "non-guest OS memory" or virtual machine normal (VM-Normal) memory.

In solutions of this application, the non-guest OS memory is defined as the swappable memory. When the physical memory is insufficient, memory swapping is allowed only for the swappable memory (to be specific, storing part or all of the data in the swappable memory into swap space in a nonvolatile memory (for example, a magnetic disk)), and not allowed for other memory (for example, the hypervisor management memory and the guest OS memory). In this way, on one hand, memory swapping is performed for part of memory instead of global memory, thereby freeing up a specific amount of memory space and optimizing occupation of system memory. On the other hand, in this application, only the data in the non-guest OS memory such as memory of an application program is allowed to be swapped to a magnetic disk, the non-guest OS memory has relatively little impact on system performance, and there is high user acceptability in a case of service hysteresis, thereby avoiding a problem that computer performance significantly deteriorates in a virtual machine over-submission scenario, and improving stability in running of the virtual machines and users' use experience. The reason is as follows: if data such as data in the hypervisor management memory or data in the guest OS memory is swapped to a magnetic disk, when a memory page of the data needs to be accessed again, accessing the data from the magnetic disk causes an entire virtual machine process to wait for data access for a long time, and further results in a severe performance problem that a user service process sharply fluctuates and even a stability problem.

It should be noted that in various aspects and various possible embodiments of this application, swapping does not mean exchanging in a usual sense, and swapping in this application indicates memory swapping in the field of memory management, that is, transferring data in memory to a magnetic disk, or it may be understood as storing data that is previously stored in memory into a magnetic disk.

Based on the first aspect, in some possible embodiments, the identifying memory of a non-operating system of a virtual machine from total memory includes: identifying the memory of the virtual machine from the total memory allocated to the virtual machine; and identifying the memory of the non-operating system of the virtual machine from the memory of the virtual machine as the swappable memory.

In an embodiment of this application, memory such as the hypervisor management memory and the guest OS memory may also be collectively referred to as critical memory, and memory such as the non-guest OS memory may also be referred to as non-critical memory. It can be learned that a key point of the technical solutions of this application is to identify the non-critical memory and use the non-critical memory as the memory for which memory swapping is allowed. The virtual machine memory is identified from the virtual machine process memory, and the non-operating system memory is identified from the virtual machine memory, improving efficiency of identifying the non-critical memory. When the physical memory is tight, memory swapping can be performed for the non-critical memory, ensuring reliability in running of the virtual machine and improving users' use experience.

Based on the first aspect, in some possible embodiments, after identifying the memory of the virtual machine from the total memory allocated to the virtual machine, the method further includes: adding tag information to both the memory of the operating system of the virtual machine and the memory of the non-operating system of the virtual machine, where the tag information indicates that memory swapping is allowed for data in the tagged memory; further, identifying the memory of the non-operating system of the virtual machine from the memory of the virtual machine, deleting the tag information of the memory of the operating system of the virtual machine, and retaining the tag information of the memory of the non-operating system of the virtual machine; and storing part or all of data in the memory with the tag information into a nonvolatile memory.

It can be learned that in this embodiment of this application, after the non-critical memory (e.g., the non-guest OS memory) is identified, it can be ensured that only the non-critical memory has the tag information, and the critical memory (e.g., the hypervisor management memory and the guest OS memory) does not have the tag information. The tag information is used as a swappable memory tag. When the physical memory of the physical host is insufficient, only data in memory with the tag information may be stored into a magnetic disk, whereas data in memory without the tag information is not allowed to be stored into a magnetic disk. This ensures that memory swapping is not performed for the critical memory, guarantees performance of the virtual machine, and helps improve a reuse rate of memory in a virtual machine system by further increasing a quantity of virtual machines, thereby greatly improving users' use experience.

Based on the first aspect, in some possible embodiments, the identifying the memory of the virtual machine from the total memory allocated to the virtual machine includes: determining memory purposes of different memory segments in the total memory allocated to the virtual machine, where the memory purposes include being used by the virtual machine and being used by the hypervisor; and using all memory segments that are to be used by the virtual machine as the memory of the virtual machine.

A memory segment represents a whole including some memory pages with consecutive memory addresses. The physical memory generally includes a plurality of memory segments.

A QEMU is used as an example. The QEMU is an emulation processor that distributes source code under a general public license (GPL). The QEMU emulates a plurality of memory devices: a device memory module (e.g., pc.ram), a memory inline storage module (e.g., memdimm), and a memory node (e.g., ram-node). An actual memory segment may be configured for all the several memory devices and provided to a virtual machine for use. Therefore, the memory segments configured for the several memory devices may be all identified as the virtual machine memory.

In this way, the swappable memory tag, that is, the tag information, may be subsequently added to the virtual machine memory. In this case, remaining untagged memory is the critical memory, that is, belongs to the hypervisor management memory, for which memory swapping is not allowed subsequently. In this way, the hypervisor management memory is distinguished from the virtual machine memory. Therefore, when this embodiment of this application is implemented, efficiency of identifying the virtual machine memory can be improved. After the virtual machine memory is identified, the hypervisor management memory can be indirectly determined, thereby avoiding a problem of low identification efficiency that may result from direct identification of the hypervisor management memory, guaranteeing the performance of the virtual machine, and improving stability in running of the virtual machine.

Based on the first aspect, in some possible embodiments, identifying the memory of the non-operating system of the virtual machine from the memory of the virtual machine as the swappable memory includes: applying for free memory in the memory of the virtual machine, to obtain memory addresses of all the free memory; and using memory corresponding to the memory addresses of all the free memory as the memory of the non-operating system of the virtual machine (e.g., the non-guest OS memory), and using the memory of the non-operating system of the virtual machine as the swappable memory.

The free memory is memory that is in the virtual machine memory and that does not yet establish a mapping relationship with a memory page in the physical memory (that is, no memory page is actually allocated).

In this case, memory other than the non-guest OS memory in the virtual machine memory is the guest OS memory, that is, memory that remains in the virtual machine memory and that cannot be applied for is the guest OS memory. In this way, the guest OS memory is distinguished from the non-guest OS memory in the virtual machine memory. In a process of identifying the virtual machine memory, both the guest OS memory and the non-guest OS memory have the tag information. In an embodiment of this application, after the guest OS memory is distinguished from the non-guest OS memory, the tag information of the guest OS memory may be deleted, so that the guest OS memory changes to non-swappable memory, and the tag information of the non-guest OS memory may be retained, so that the non-guest OS memory is used as the swappable memory. Therefore, when this embodiment of this application is implemented, efficiency of identifying the non-critical memory (the non-guest OS memory) can be improved, the performance of the virtual machine can be guaranteed, and stability in running of the virtual machine can be improved.

Based on the first aspect, in some possible embodiments, the identifying the memory of the virtual machine from the total memory allocated to the virtual machine includes: identifying, in a startup phase of the virtual machine, the memory of the virtual machine from the total memory allocated to the virtual machine; and the identifying the memory of the non-operating system of the virtual machine from the memory of the virtual machine as the swappable memory includes: identifying the memory of the non-operating system of the virtual machine from the memory of the virtual machine as the swappable memory in a running phase after the virtual machine starts up.

In other words, a virtual machine initialization process is created in the initialization and startup phase of the virtual machine, to allocate the required total memory, that is, the virtual machine process memory, to the virtual machine process. In this way, relevant data of the virtual machine and the hypervisor is loaded into the memory, and further, the virtual machine memory can be identified from the virtual machine process memory. When the virtual machine is running after starting up, relevant code and data of the operating system (e.g., the guest OS) of the virtual machine is loaded into the memory, and further, the non-guest OS can be identified from the virtual machine memory. For example, the non-guest OS memory is identified by applying for free memory, and the non-guest OS memory is used as the swappable memory. Because the identification work is performed in advance, once the physical memory is tight (e.g., the physical memory is insufficient), a quick response can be made, and memory swapping can be performed for the swappable memory, quickly optimizing memory occupation while ensuring stable running and reliability of the entire system.

In an embodiment of this application, when a ratio of available memory pages remaining in physical memory to total memory pages in the physical memory reaches a water level specified for the physical memory (that is, when physical memory usage is tight, or the physical memory is insufficient), data on some memory pages in the physical memory may be stored into swap space in a nonvolatile memory (for example, a magnetic disk), so that these memory pages free up memory space to meet a new memory application requirement. Later, when the data needs to be used, the data is then transferred from the swap space in the nonvolatile memory (for example, a magnetic disk) back to the physical memory.

The water level specified for the physical memory represents a ratio that is set for the physical memory and that is of remaining available memory pages to total memory pages in the physical memory. When a ratio of available memory remaining in the physical memory to total memory reaches a preset water level threshold, memory swapping needs to be performed.

In other words, when a ratio of available memory pages remaining in the physical memory of the physical host in which the virtual machine is located to total memory pages in the physical memory reaches the preset threshold, the data in the swappable memory is stored into a nonvolatile memory.

In an embodiment, the water level specified for the physical memory may be set to be close to 0%. In this case, the physical memory is in a full load state. In other words, when the physical memory of the physical host in which the virtual machine is located is in the full load state, the data in the swappable memory is stored into a nonvolatile memory, where the full load state indicates that the physical memory has no free space for storing a new memory page.

It can be learned that when the physical memory is fully loaded or occupation of the physical memory reaches a specific ratio, the solutions of this application may be used for memory swapping, helping design memory optimization based on an actual situation, and improving users' use experience.

Based on the first aspect, in some possible embodiments, the method further includes: if physical memory usage is tight or the physical memory is insufficient, when the virtual machine applies for memory allocation, determining a memory type of memory to be allocated; and when the memory type belongs to the management memory of the hypervisor or the memory of the operating system of the virtual machine, skipping triggering memory reclamation, or when the memory type belongs to the memory of the non-operating system of the virtual machine, triggering memory reclamation.

In an embodiment, an implementation process of memory reclamation includes: obtaining a plurality of memory pages from the physical memory; filtering the plurality of memory pages, where a filtering rule includes removing a memory page without the tag information and retaining a memory page with the tag information; and storing data on the memory page with the tag information into swap space in a nonvolatile memory, so that the physical memory frees up storage space for new memory allocation.

In an embodiment of this application, in the running phase of the virtual machine, when physical memory allocation needs to be applied for when the physical memory is tight, different operations may be performed for the critical memory and the non-critical memory in memory reclamation. To be specific, for the non-critical memory, a memory reclamation operation may be triggered, to optimize memory occupation and improve operating performance of the virtual machine system. For the critical memory, no memory reclamation operation is triggered during physical memory allocation (that is, allowing delayed triggering of memory reclamation for the critical memory), thereby improving a memory allocation speed, avoiding, when the memory is tight, a performance fluctuating problem that results from the critical memory being swapped, improving reliability and stability of the system, and guaranteeing users' use experience.

Based on the first aspect, in some possible embodiments, the solutions of this application may be implemented in the virtual machine over-submission scenario, that is, before the total memory is allocated to the virtual machine process, a virtual machine over-submission function may be configured by using a function switch. Virtual machine oversubmission means that a sum of amounts of total memory of all virtual machines starting up on a physical host exceeds a size of actual physical memory. More virtual machines are created by using a virtualization platform on each physical host, utilization of memory resources of the physical hosts is improved, and memory costs are reduced. The solutions of this application can ensure the performance and reliability of the virtual machine when memory swapping is performed for the memory of the virtual machine.

According to a second aspect, an embodiment of this application provides still another virtual machine memory management method. The method includes: identifying memory of a virtual machine from total memory allocated to the virtual machine, where the total memory includes memory of the virtual machine and management memory of a hypervisor, the memory of the virtual machine is used to store code of the virtual machine and data generated during running of the virtual machine, and the management memory of the hypervisor is used to store data required for the hypervisor to manage the virtual machine; using the memory of the virtual machine as swappable memory, where the swappable memory represents memory for which memory swapping is allowed; and storing data in the swappable memory into a nonvolatile memory.

In solutions of this application, the memory of the virtual machine is defined as the swappable memory. When the physical memory is insufficient, memory swapping is allowed only for the swappable memory (to be specific, storing part or all of the data in the swappable memory into swap space in a nonvolatile memory (for example, a magnetic disk)), and not allowed for the management memory of the hypervisor. In this way, on the one hand, memory swapping is performed for part of memory instead of global memory, thereby freeing up a specific amount of memory space and optimizing occupation of system memory. On the other hand, in this application, only data in non-guest OS memory such as memory of an application program and data in guest OS memory are allowed to be swapped to a magnetic disk, thereby also ensuring stability in running of the virtual machine and improving users' use experience to some extent. The reason is as follows: If data such as data in the hypervisor management memory is swapped to a magnetic disk, when a memory page of the data needs to be accessed again, accessing the data from the magnetic disk causes an entire virtual machine process to wait for data access for a long time, and further results in a severe performance problem that a user service process sharply fluctuates and even a stability problem.

According to a third aspect, an embodiment of this application provides a virtual machine memory management device. The device includes a swappable memory determining module, configured to identify memory of a non-operating system of a virtual machine from total memory allocated to the virtual machine. The total memory includes memory of the virtual machine and management memory of a hypervisor. The memory of the virtual machine is used to store code of the virtual machine and data generated during running of the virtual machine. The management memory of the hypervisor is used to store data required for the hypervisor to manage the virtual machine. The memory of the virtual machine includes memory of an operating system of the virtual machine and the memory of the non-operating system of the virtual machine. The memory of the operating system of the virtual machine is used to store code and data of the operating system of the virtual machine. The memory of the non-operating system of the virtual machine is memory other than the memory of the operating system of the virtual machine in the memory of the virtual machine. The swappable memory determining module is further configured to use the memory of the non-operating system of the virtual machine as swappable memory, where the swappable memory represents memory for which memory swapping is allowed. The device further includes a memory swapping module, configured to store data in the swappable memory into a nonvolatile memory.

The device can implement, by using the functional modules, the method described in any embodiment of the first aspect.

According to a fourth aspect, an embodiment of this application provides still another virtual machine memory management device. The device includes a swappable memory determining module, configured to identify memory of a virtual machine from total memory allocated to the virtual machine. The total memory includes the memory of the virtual machine and management memory of a hypervisor. The memory of the virtual machine is used to store code of the virtual machine and data generated during running of the virtual machine. The management memory of the hypervisor is used to store data required for the hypervisor to manage the virtual machine. The swappable memory determining module is further configured to identify the memory of the virtual machine from the total memory. The device further includes a memory swapping module, configured to use the memory of the virtual machine as swappable memory, where the swappable memory represents memory for which memory swapping is allowed.

The device can implement, by using the functional modules, the method described in the second aspect.

According to a fifth aspect, an embodiment of this application provides a computer device, including at least one processor and a memory. The processor and the memory are connected or coupled together through a bus. The memory is configured to store one or more computer programs. The one or more computer programs include instructions. The processor is configured to execute the one or more computer programs to implement the method described in any embodiment of the first aspect.

According to a sixth aspect, an embodiment of this application provides still another computer device, including at least one processor and a memory. The processor and the memory are connected or coupled together through a bus. The memory is configured to store one or more computer programs. The one or more computer programs include instructions. The processor is configured to execute the one or more computer programs to implement the method described in the second aspect.

According to a seventh aspect, an embodiment of this application provides a computer-readable storage medium, on which instructions are stored. When the instructions are executed, one or more processors of a computer device are enabled to perform the method in any possible embodiment of the first aspect or the second aspect.

According to an eighth aspect, an embodiment of this application provides a computer program including program code. When the program code is run on a computer device, the method in any possible embodiment of the first aspect or the second aspect is performed.

It can be learned that when the embodiments of this application are implemented, the non-critical memory (for example, the non-guest OS memory) can be identified from the virtual machine process memory as the swappable memory in advance, and when memory swapping needs to be performed between the physical memory and swap space, memory swapping needs to be performed only for data on some memory pages in the non-critical memory, and does not need to be performed for the critical memory (for example, the hypervisor management memory or the guest OS memory), thereby greatly reducing impact on the entire virtual machine process and virtual machine system performance, and avoiding sharp fluctuations in performance and the stability problem when the memory is tight. It can also be learned that in the embodiments of this application, the critical memory (for example, the hypervisor management memory or the guest OS memory) does not need to be directly identified, thereby avoiding an identification difficulty resulting from the critical memory being of diversified and uncertain types. In addition, implementation of the embodiments of this application helps improve memory use efficiency by increasing a quantity of virtual machines, thereby greatly improving users' use experience.

BRIEF DESCRIPTION OF DRAWINGS

FIG. 7 is a schematic diagram of an architecture of still another device implementing a virtual machine memory management method according to an embodiment of this application;

FIG. 12 is a schematic flowchart of still another virtual machine memory management method according to an embodiment of this application.

DESCRIPTION OF EMBODIMENTS

The following describes various implementations of this application in detail based on the accompanying drawings.

It should be understood that this specification is not intended to limit this application to those implementation examples. Rather, this application is intended to cover these implementation examples, and various alternatives, modifications, equivalents, and other implementations that may be included within the spirit and scope of this application as defined by the appended claims.

A virtual machine memory management method provided in this application may be applied to a physical host (or referred to as a physical host).

Figure 1:
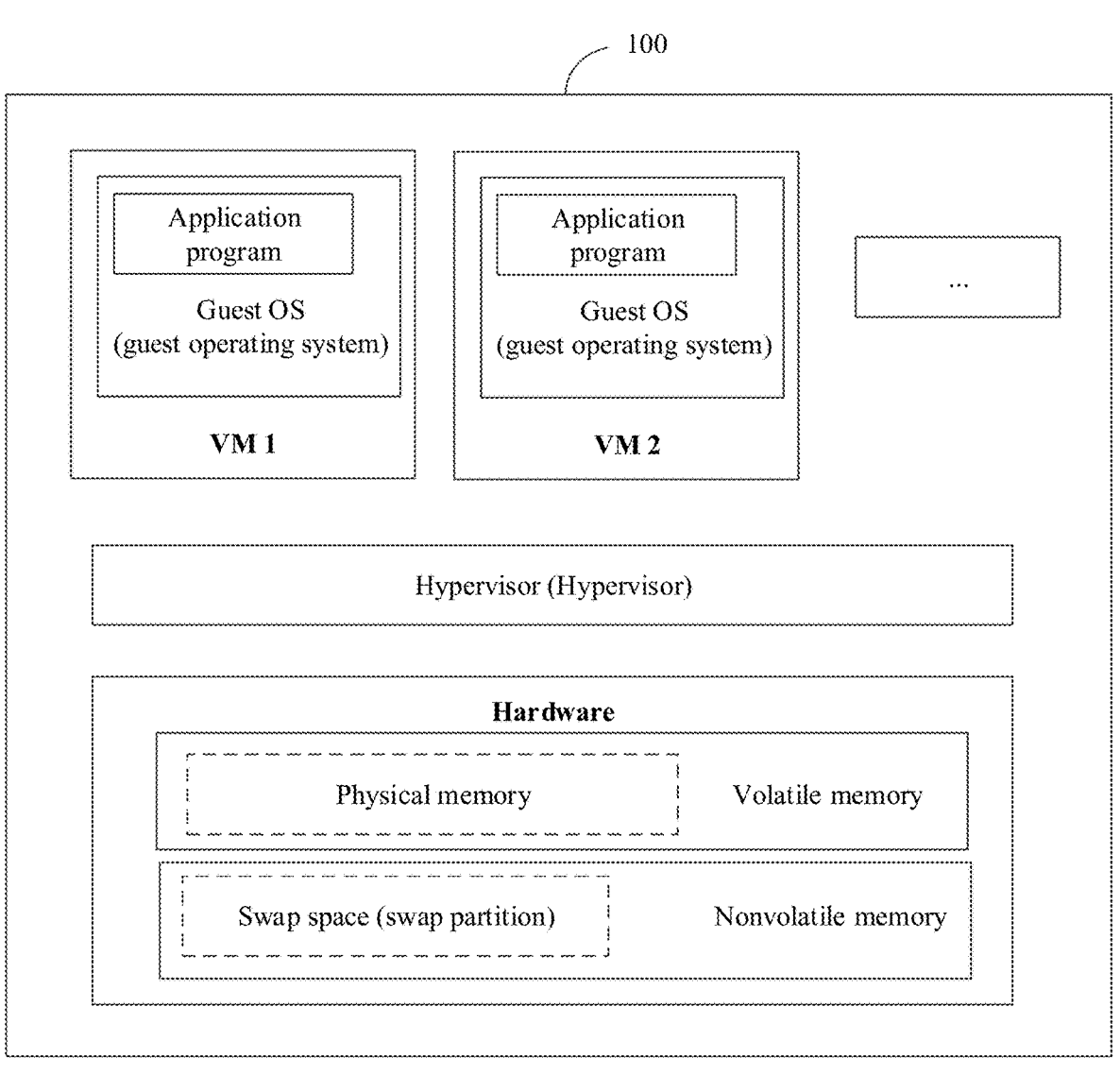
FIG. 1 is a schematic diagram of a system architecture of a physical host applying a virtualization technology according to an embodiment of this application.

FIG. 1 is an example of a schematic diagram of a system architecture of a physical host 100 applying a virtualization technology according to an embodiment of this application. As shown in FIG. 1, the physical host 100 includes hardware of a server, one or more virtual machines running in a virtual environment, and a hypervisor running between the server hardware and the virtual machines.

The virtual machine (VM) is a computer system that is simulated by using software, has hardware system functions, and runs in an isolated environment. The VM further includes a guest operating system (Guest OS) and a guest OS-based application program. The guest OS is an operating system running in a VM. For example, the guest OS may be a kernel mode OS or a user mode OS. As shown in the figure, a VM 1 and a VM 2 are used as examples. Guest OSs and guest OS-based application programs of the VM 1 and the VM 2 may independently run in the VM 1 and the VM 2, respectively.

The hypervisor may also be referred to as a virtual machine management program, and is an intermediate software layer running between the server hardware and the operating systems of the virtual machines. The hypervisor may be used to manage one or more VMs, and allows a plurality of VMs to share the server hardware, for example, access all physical devices of the server, including memory, a CPU, a network adapter, a magnetic disk, and the like, to implement abstraction of physical hardware. The hypervisor not only coordinates shared access of the virtual machines to these hardware resources, but also may provide protection between the virtual machines.

The server hardware includes storage resources of the server, and the storage resources further include a volatile memory and a nonvolatile memory. The volatile memory is configured to provide physical memory of the server. The physical memory usually is memory space that is in the volatile memory (for example, a physical memory module) and that provides temporary storage for the hypervisor, an operating system, and various application programs. The physical memory is used to store a plurality of memory segments, and each memory segment includes a plurality of memory pages. In this embodiment of this application, the memory pages of the physical memory may be used to store code and data corresponding to the hypervisor, the guest OSs, and the application programs.

The nonvolatile memory may be configured to provide swap space. The swap space is a segment of storage space (or referred to as address space) in the nonvolatile memory. The swap space is used to store data swapped from the physical memory. In other words, when available memory in the physical memory is insufficient, part of data stored in the physical memory, for example, data on memory pages, data in blocks, or data in storage units at a granularity of another type, may be stored into the swap space in the nonvolatile memory. In this way, the memory pages, the blocks, or the storage units of the another type in the physical memory can free up the memory due to migration of the data. The swap space provided by the nonvolatile memory may be, for example, a swap partition or a page swap file in a specific implementation scenario.

In some implementations, the volatile memory may be a memory such as a double data rate synchronous dynamic random access memory (DDR SDRAM), a static random access memory (SRAM), or a random access memory (RAM), and the nonvolatile memory may be a memory such as a flash memory or a magnetic disk.

The following describes concepts of virtual machine over-submission and memory swapping that occur in the embodiments of this application.

Virtual machine over-submission means that a sum of amounts of memory allocated to all virtual machines starting up on a physical host exceeds a size of actual physical memory.

For example, in a virtual machine over-submission scenario, a size of physical memory is 100 GB, ten VMs are started on a physical host, and memory allocated to each VM is of 20 GB. In this case, a sum of amounts of the memory allocated to the ten VMs is 200 GB, exceeding the size of the actual physical memory.

For another example, in still another virtual machine over-submission scenario, a size of physical memory is 100 GB, one VM is started on a physical host, and memory allocated to the VM is of 150 GB. That is, in this case, a total amount of a specification of the virtual machine is 150 GB, exceeding the size of the actual physical memory.

It should be noted that the foregoing examples are merely used to explain the concept rather than to limit it.

By using a virtual machine over-submission technology, a quantity of virtual machines running on a single physical host can be increased, thereby improving memory usage and reducing memory costs. Memory may be allocated to a single VM on demand, and peak load hours of different VMs may vary. Therefore, physical memory is abundant most of the time. However, in few circumstances, a sum of amounts of memory required by virtual machines running on a physical host may exceed physical memory, resulting in triggering of memory swapping.

Memory swapping means that when a ratio of available memory pages remaining in physical memory to total memory pages in the physical memory reaches a threshold specified for the physical memory, data on some memory pages in the physical memory may be stored into a magnetic disk, to free up memory space for a new application requirement. When the data on the memory pages needs to be used, the data is then transferred back to the physical memory.

The threshold specified for the physical memory may be a threshold that is set for the physical memory and that is for a ratio of remaining available memory pages to total memory pages in the physical memory. When a ratio of available memory to total memory reaches the preset threshold, memory swapping needs to be performed.

For example, the threshold specified for the physical memory may be set to 10%. When the ratio of available memory pages remaining in physical memory to total memory pages in the physical memory is as small as 10%, some of memory pages in the physical memory may be stored into a magnetic disk.

Figure 2:
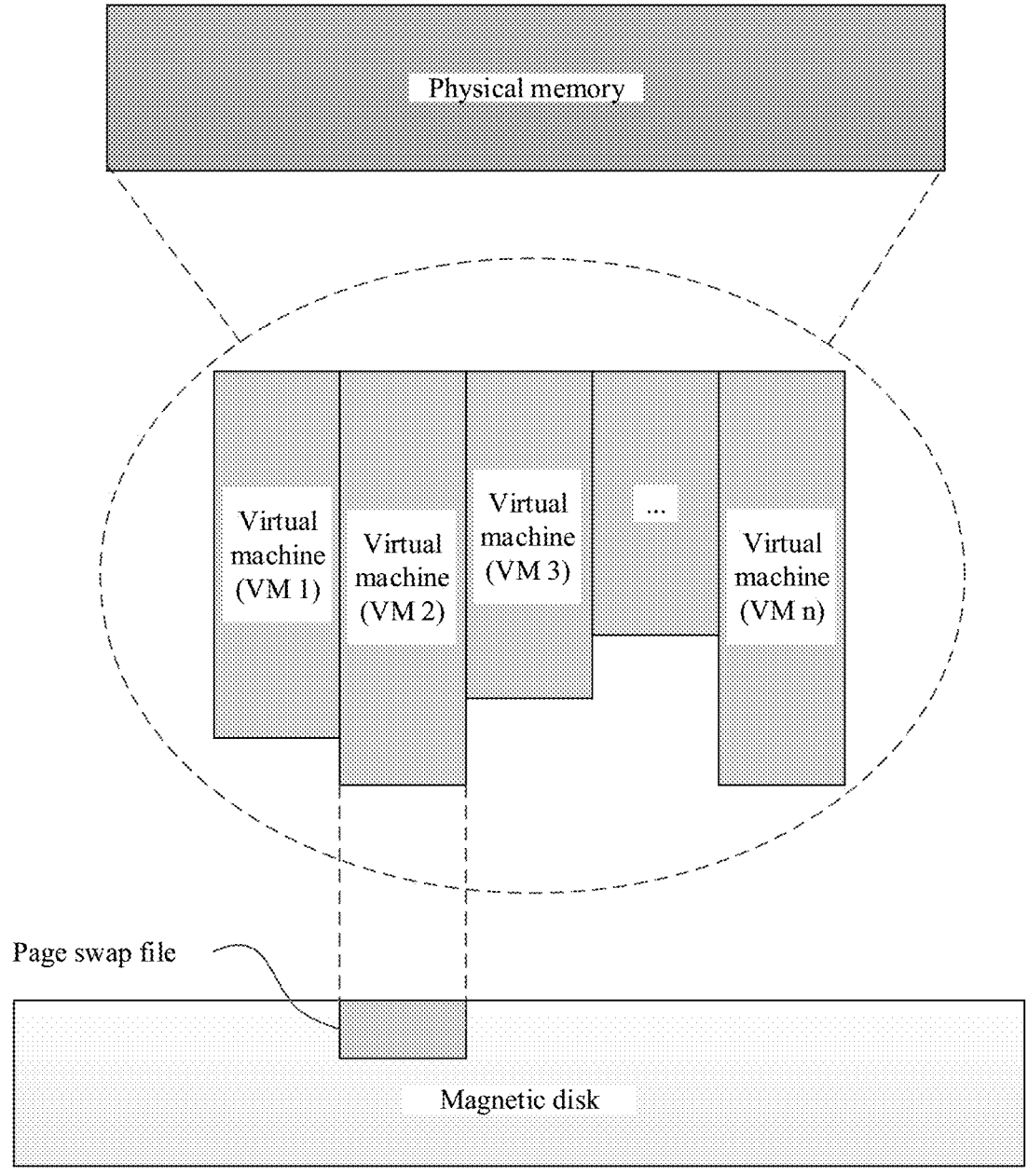
FIG. 2 is a schematic diagram of memory swapping occurring in a virtual machine over-submission scenario according to an embodiment of this application.

For another example, the threshold specified for the physical memory may be set to be close to 0% (that is, when the physical memory is in a full load state). As shown in FIG. 2, in a virtual machine over-submission scenario, when a sum of amounts of memory actually used by different virtual machines (a VM 1 to a VM n) on a physical host reaches a full load of the physical memory, some of memory pages in the physical memory may be stored into a magnetic disk. As shown in FIG. 2, memory swapping is performed for a VM 2, so that some of memory pages of the VM 2 are stored into a page swap file in the magnetic disk.

It should be noted that in specific implementation, the threshold specified for the physical memory may be set based on an actual situation, and this is not specifically limited in this application.

Due to differences in media access speeds, a speed of accessing memory pages in a magnetic disk is far lower than a speed of accessing memory pages in physical memory. In an existing conventional memory swap solution, when the physical memory is insufficient, some inactive memory pages in the physical memory are usually swapped to a magnetic disk, and when the memory pages need to be used, the memory pages are then swapped back to the physical memory. Consequently, some memory pages with a relatively high requirement for an access speed, for example, a management memory page of a hypervisor and a memory page of a guest OS, are swapped to a magnetic disk due to reasons such as being temporarily inactive. When the memory pages need to be accessed again, accessing the memory pages from the magnetic disk causes an entire virtual machine process to wait for data access for a long time, and results in a severe performance problem that a user service process sharply fluctuates and even a stability problem, consequently causing severely degraded user experience.

In an existing solution, to avoid impact caused by memory swapping on memory of an important process, a memory lock (mlock) technology is used, in which an mlock interface is directly called in program code to lock a part of memory (for example, hypervisor management memory, memory occupied by a guest OS, and memory occupied by an application program), with the part of memory not being swapped to a physical disk. mlock is a mechanism used by a kernel to lock memory, and is used to lock part or all of memory used by a process to physical memory. A locked memory page is not swapped to a magnetic disk before being unlocked or before the process exits.

However, technical deficiencies of the solution include the following: (1) The mlock interface needs to be explicitly called when the technology is used, but many types of critical memory are dynamically applied for, and therefore, the critical memory cannot be locked by identifying each critical memory and then explicitly calling mlock; (2) because the critical memory is of diversified and uncertain types, all types of the critical memory cannot be identified at a time, and specific critical memory can be identified only after running for a relatively long period of time, with low identification efficiency; and (3) the mlock manner causes undifferentiated allocation of all memory in advance, damaging an on-demand memory allocation feature in an oversubmission scenario, and memory already allocated cannot be reclaimed even if an munlock operation is performed, resulting in a decrease in a reuse rate of memory in a system.

To resolve at least one of the technical deficiencies of the conventional technology, the embodiments of this application provide a virtual machine memory management method and a related device.

Figure 3:
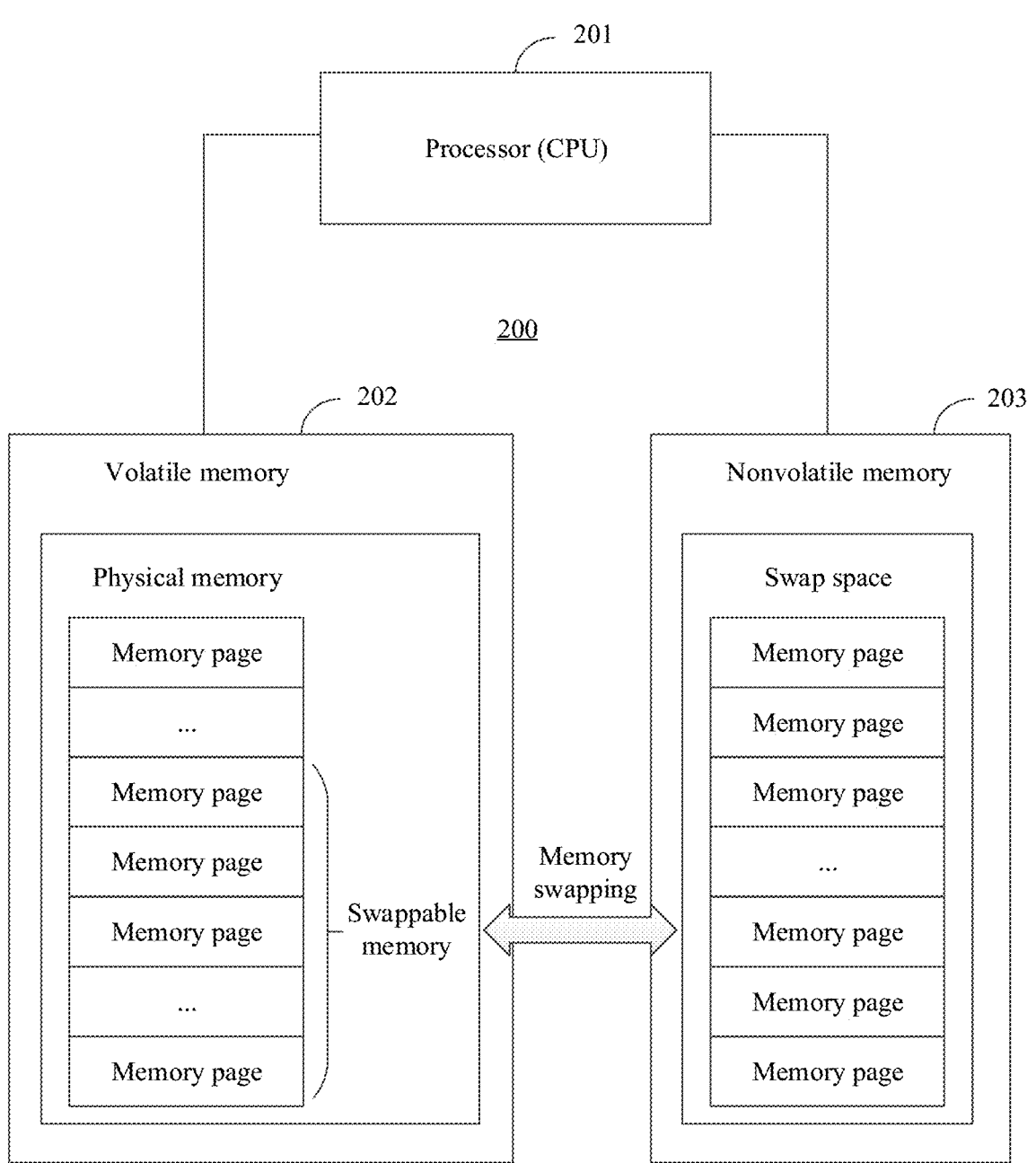
FIG. 3 is a schematic diagram of a structure of a device implementing a virtual machine memory management method according to an embodiment of this application.

FIG. 3 is a schematic diagram of a structure of a device 200 implementing a virtual machine memory management method according to an embodiment of this application. The device 200 includes a processor 201, a volatile memory 202, and a nonvolatile memory 203. In some implementations, the device 200 may be the physical host 100 described in the embodiment in FIG. 1.

The processor 201 includes one or more general-purpose processors. The general-purpose processor may be any type of device that can process an electronic instruction, and includes a central processing unit (CPU), a microprocessor, a microcontroller, a main processor, a controller, an application-specific integrated circuit (ASIC), or the like. The processor 201 executes various types of digital storage instructions. For example, the processor 201 may run software or firmware programs stored in the volatile memory 202. For another example, the processor 201 can execute a program or process data, to execute at least a part of the method discussed in this specification.

The volatile memory 202 is configured to provide physical memory. The physical memory is used to store a plurality of memory pages. In this embodiment of this application, the memory pages of the physical memory may be used to store code and data corresponding to a hypervisor, a guest OS, and application programs. The volatile memory 202 is further configured to store logic code or instructions corresponding to various requirements run by the processor 201 in the volatile memory 202.

The nonvolatile memory may be configured to provide swap space. The swap space is used to implement a memory swap function with the physical memory, and store a plurality of memory pages swapped from the physical memory.

In some possible implementations, the volatile memory 202 may be a volatile memory such as a DDR, an SDRAM, or an SRAM, and the nonvolatile memory 203 may be a nonvolatile memory such as a flash memory or a magnetic disk.

Figure 4:
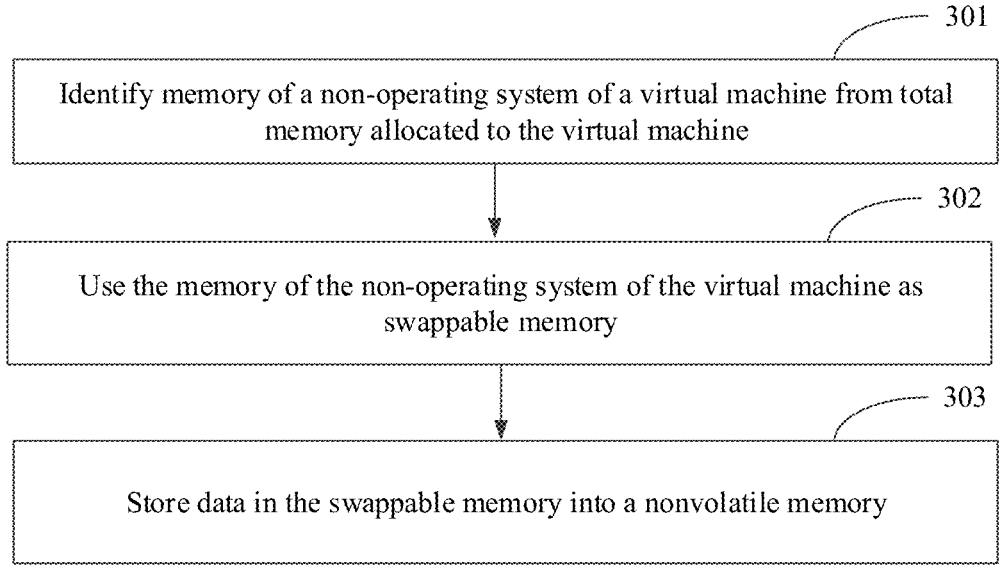
FIG. 4 is a schematic flowchart of a virtual machine memory management method according to an embodiment of this application.

In an embodiment of this application, when memory swapping needs to be performed between the physical memory in the volatile memory 202 and the swap space in the nonvolatile memory, the processor 201 performs page swapping on a selected memory page between the physical memory and the swap space. Specifically, the processor (e.g., CPU) 201 may perform a virtual machine memory management method shown in FIG. 4, including but not limited to the following operations.

S301: Identify memory of a non-operating system of a virtual machine from total memory allocated to the virtual machine.

In an embodiment, the total memory allocated to the VM includes memory of the VM and memory of a hypervisor. The hypervisor is used to coordinate shared access performed by virtual machines to these hardware resources such as memory, a CPU, a network adapter, and a magnetic disk. When the virtual machines start up, each virtual machine has data that needs to be stored, such as a corresponding data structure and buffered data. Therefore, to create the virtual machine, the memory of the VM and the management memory of the hypervisor need to be allocated. The memory of the virtual machine is used to store code and data of the virtual machine, and the management memory of the hypervisor is used to store data required for the hypervisor to manage running of the virtual machine. The data stored in the management memory of the hypervisor may be, for example, data structures describing various hardware devices (such as a CPU, memory, a network adapter, a magnetic disk, and a graphics card), and management information of each hardware device. The CPU is used as an example. Information including a quantity of CPUs, a description of a simulated CPU hardware architecture, and the like is recorded in the management information of the CPU. The data stored in the management memory of the hypervisor may also be, for example, buffered data such as buffered data for display and buffered data for input/output (IO).

The memory of the VM further includes memory of an operating system of the VM and the memory of the non-operating system of the VM. The memory of the operating system of the virtual machine is used to store code and data of the operating system of the virtual machine, and the memory of the non-operating system of the VM is memory other than the memory of the operating system of the VM in the memory of the VM.

The memory of the operating system of the virtual machine is used to store the code and data of the operating system of the virtual machine. The data stored in the memory of the operating system of the virtual machine may be, for example, a compilation library, stack data required for running an application program, data required during running of a kernel module of a guest OS, and the like.

The memory of the non-operating system of the virtual machine may be used to store, for example, relevant code and data of various application programs running on the guest OS. Specific data of the application programs may include, for example, data that is of a database program and that is loaded into memory, data of a file opened by a word processing program, and the like.

In other words, when the virtual machine starts up, an operating system of a physical host (Host OS) allocates a memory specification (that is, a size of the total memory) of the virtual machine to the virtual machine. The memory specification indicates the size of the total memory that is allowed to be applied for by the virtual machine for use. The memory specification covers a size of the memory of the virtual machine and a size of the management memory of the hypervisor. The size of the memory of the virtual machine is a size of memory provided for the virtual machine to apply for, and the size of the management memory of the hypervisor is a size of memory provided for the hypervisor to apply for. The memory of the virtual machine covers the memory of the operating system of the virtual machine and the memory of the non-operating system of the virtual machine. In this application, the operating system of the virtual machine may also be referred to as a guest operating system (Guest OS). A size of the memory of the guest OS is a size of memory provided for the guest OS to apply for. Correspondingly, the non-operating system of the virtual machine in this specification may be referred to as a non-guest OS. The memory of the non-guest OS is memory other than the memory of the guest OS in the memory of the virtual machine.

For ease of description, in this specification, the total memory allocated to the VM is also referred to as "virtual machine process memory" for short, the management memory of the hypervisor is also referred to as "hypervisor management memory" for short, the memory of the virtual machine is also referred to as "virtual machine memory" for short, the memory of the operating system of the virtual machine is also referred to as "guest OS memory" for short, and the memory of the non-operating system of the virtual machine is also referred to as "non-guest OS memory" or virtual machine normal (VM-Normal) memory.

In other words, the virtual machine process memory covers the hypervisor management memory and the virtual machine memory, and the memory of the virtual machine covers the memory of the operating system of the virtual machine and the memory of the non-operating system of the virtual machine. By performing operation S301, the non-guest OS memory can be identified from the total memory (e.g., the virtual machine process memory), that is, the non-guest OS memory can be distinguished from other memory (such as the hypervisor management memory and the guest OS memory).

S302: Use the memory of the non-operating system of the VM as swappable memory.

The hypervisor management memory and the guest OS memory have a relatively high requirement for an access speed, easily causing significant impact on an entire virtual machine process and virtual machine system performance, whereas the VM-normal memory has relatively little impact on the virtual machine process and the virtual machine system performance. Therefore, in an embodiment of this application, the VM-normal memory may be determined as the swappable memory. The swappable memory represents memory for which memory swapping is allowed.

S303: Store data in the swappable memory into a non-volatile memory.

When a ratio of available memory pages remaining in physical memory to total memory pages in the physical memory reaches a water level specified for the physical memory (that is, when physical memory usage is tight, or the physical memory is insufficient), memory swapping is performed for the swappable memory, to be specific, part or all of the data in the swappable memory is stored into swap space in a nonvolatile memory. The water level specified for the physical memory represents a ratio that is set for the physical memory and that is of remaining available memory pages to total memory pages in the physical memory. When a ratio of available memory remaining in the physical memory to total memory reaches a preset water level threshold, memory swapping needs to be performed.

In other words, to implement the method in this embodiment of this application, it is only necessary to identify the VM-normal memory from the virtual machine process memory as the swappable memory in advance. When memory swapping needs to be performed between the physical memory and the swap space, memory swapping needs to be performed only for some memory pages in the VM-normal memory, and does not need to be performed for the hypervisor management memory or the guest OS memory, thereby greatly reducing impact on the entire virtual machine process and the virtual machine system performance, and avoiding sharp fluctuations in performance and a stability problem when the memory is tight. It can also be learned that in this embodiment of this application, critical memory (e.g., the hypervisor management memory, the guest OS memory, or the like) does not need to be directly identified, thereby avoiding an identification difficulty resulting from the critical memory being of diversified and uncertain types, and improving identification efficiency by identifying the VM-normal memory. In addition, when the method in this application is implemented, an on-demand memory allocation feature in an over-submission scenario is not affected, thereby helping improve a reuse rate of memory in a virtual machine system by further increasing a quantity of virtual machines, and greatly improving users' use experience.

In an implementation of this embodiment of this application, the solutions of this application may be implemented by adding a new software code module to a hypervisor kernel of the physical host and adding a new software code module to the operating system (e.g., guest OS) of the VM.

Figure 5:
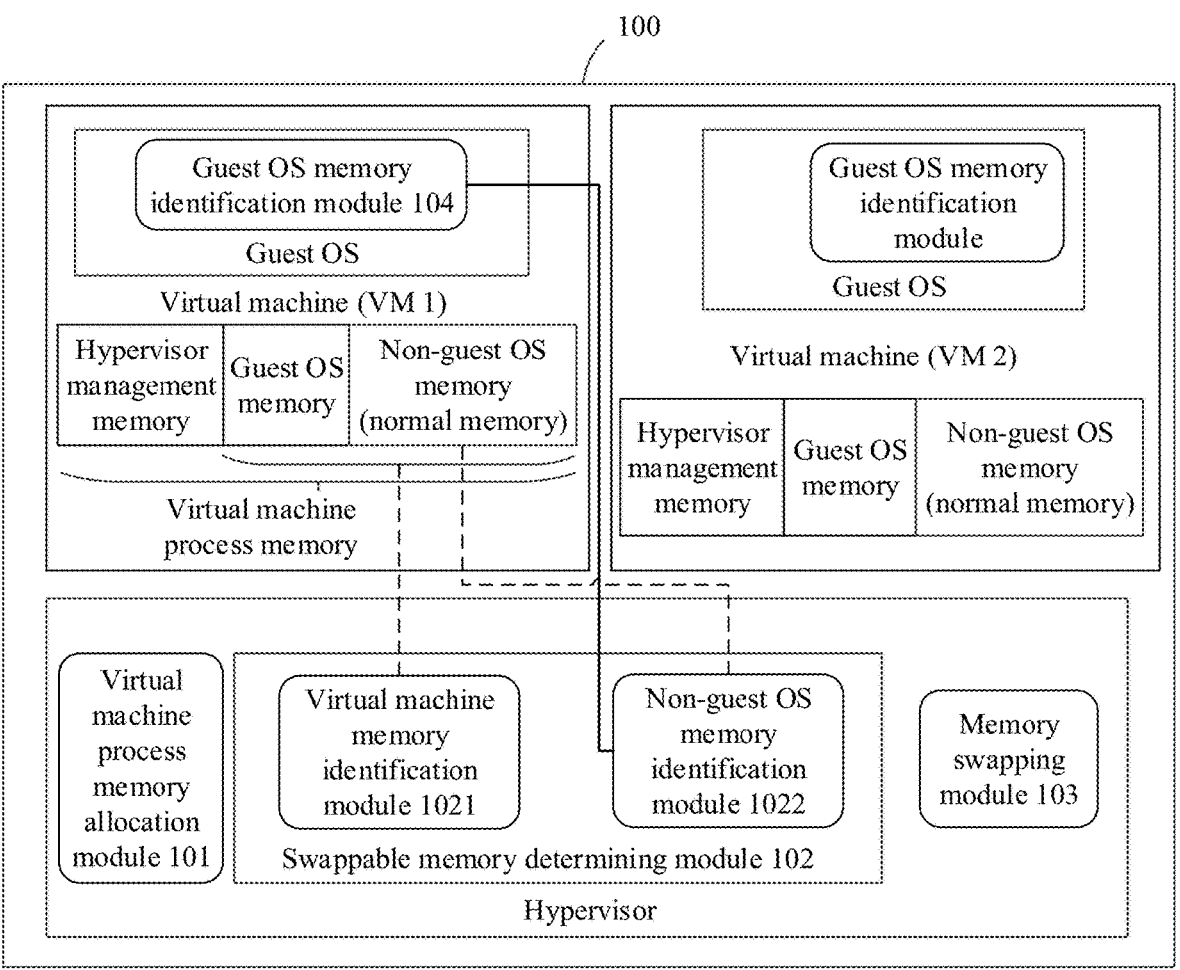
FIG. 5 is a schematic diagram of an architecture of still another device implementing a virtual machine memory management method according to an embodiment of this application.
Figure 6:
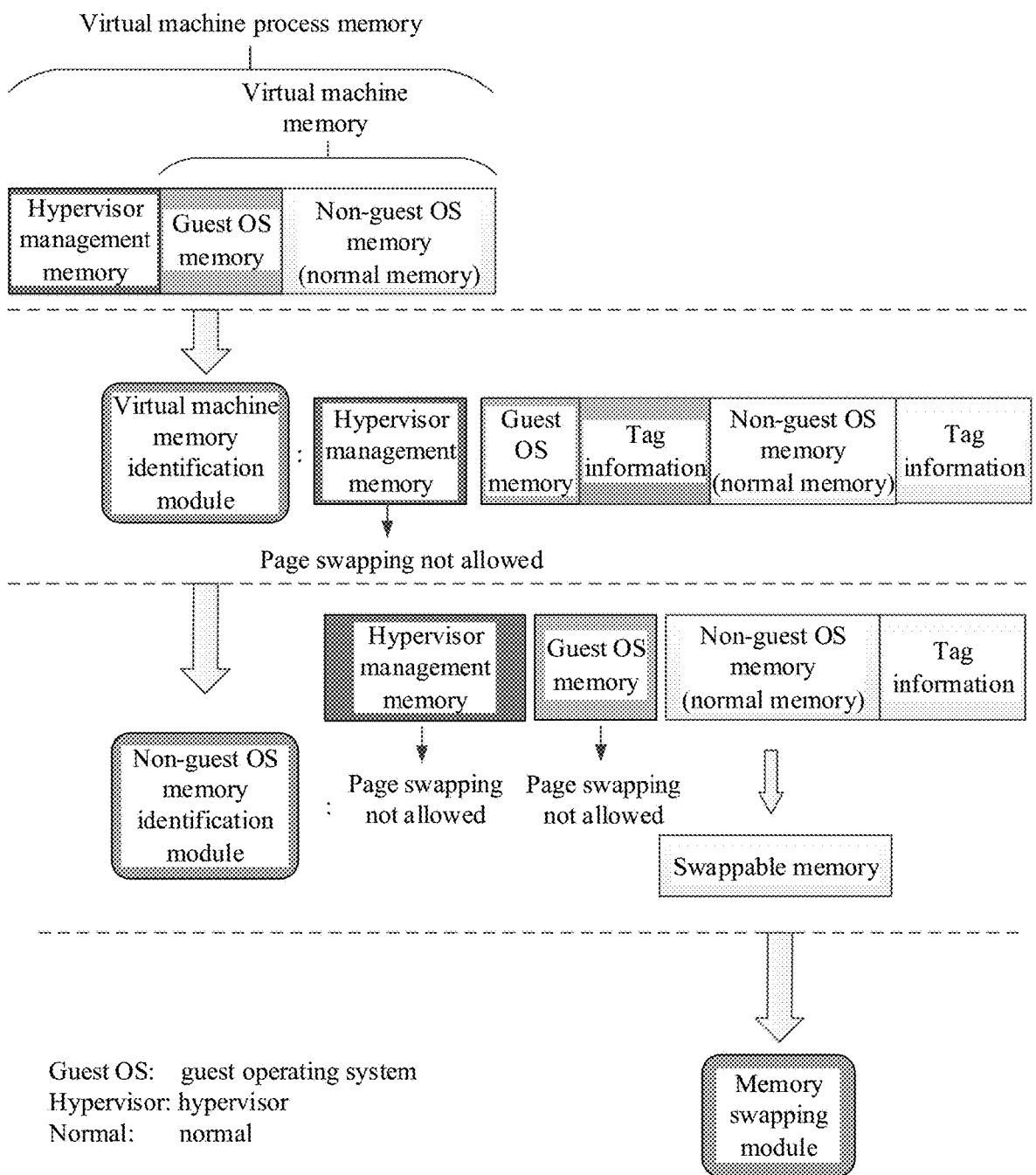
FIG. 6 is a schematic diagram of a logical procedure for determining swappable memory according to an embodiment of this application.

Referring to both FIG. 5 and FIG. 6, in an implementation, a virtual machine process memory allocation module 101, a swappable memory determining module 102, and a memory swapping module 103 may be provided in the hypervisor on a basis of the system architecture of the physical host 100 described in FIG. 1. The virtual machine process memory allocation module 101 is configured to determine memory to be allocated to a VM. The swappable memory determining module 102 is configured to identify memory of a non-operating system of the VM as swappable memory from the memory allocated to the VM. The memory swapping module 103 is configured to: when memory swapping needs to be performed for a memory page corresponding to the memory allocated to the VM, perform memory swapping for the swappable memory, that is, store part or all of data in the swappable memory into a nonvolatile memory.

In an embodiment, the swappable memory determining module 102 in the hypervisor may further include a virtual machine memory identification module 1021 and a non-operating system memory identification module 1022 (or referred to as a non-guest OS memory identification module 1022). Further, a guest OS memory identification module 104 is provided in a guest OS of each VM.

The virtual machine memory identification module 1021 is configured to identify virtual machine memory from the virtual machine process memory allocated to the VM.

In an embodiment, the virtual machine memory identification module 1021 identifies the memory of the virtual machine, that is, the virtual machine memory, from the allocated virtual machine process memory, and adds tag information to memory pages corresponding to the virtual machine memory. That is, in this case, both guest OS memory and the VM-normal memory have the tag information, where the tag information is used as a swappable memory tag. Remaining untagged memory, that is, hypervisor management memory, belongs to critical memory, for which memory swapping is not allowed, thereby protecting the hypervisor memory.

The tag information in this embodiment of this application may be, for example, a tag such as a flag bit, a label, or an identification code, and is not limited in this application.

The non-guest OS memory identification module 1022 is configured to further identify the VM-normal memory from the virtual machine memory as the swappable memory. Memory swapping is allowed for the VM-normal memory and not allowed for the guest OS memory.

In an embodiment, the guest OS memory identification module 104 in the guest OS identifies free memory that is in the guest OS and that currently can be applied for, and notifies the non-guest OS memory identification module 1022 in the hypervisor of the free memory. Further, the non-guest OS memory identification module 1022 determines the free memory as the VM-normal memory. In this case, memory that remains in the virtual machine memory and that cannot be applied for is the guest OS memory. Further, the non-guest OS memory identification module 1022 deletes the tag information of the guest OS memory and retains the tag information of the VM-normal memory, that is, uses only the VM-normal memory as the swappable memory, for which memory swapping is allowed. In this case, the guest OS memory belongs to the critical memory, for which memory swapping is not allowed, thereby protecting the guest OS memory.

Later, when physical memory is insufficient and memory swapping is required, the memory swapping module 103 may perform a memory swapping operation for a memory page in the VM-normal memory with the tag information.

It can be learned that when this embodiment of this application is implemented, the swappable memory determining module 102 may be used to identify memory (that is, the VM-normal memory) for which page swapping may be finally performed and add the tag information, and a virtual machine system performs selective swapping based on the tag information. To be specific, when physical memory of the system is insufficient, only a memory segment with the tag information may be swapped to a magnetic disk, whereas a memory segment without the tag information is not allowed to be swapped to a magnetic disk. This ensures that swapping is not performed for the critical memory (the hypervisor memory and the guest OS memory), guarantees performance of the virtual machine, and helps improve a reuse rate of the memory in the virtual machine system by further increasing a quantity of virtual machines, thereby greatly improving users' use experience.

The following further describes specific implementation processes of the solutions of this application in detail by using the following two phases as examples: a startup phase of a virtual machine, and a memory allocation and swapping phase during running of a virtual machine.

Figure 8:
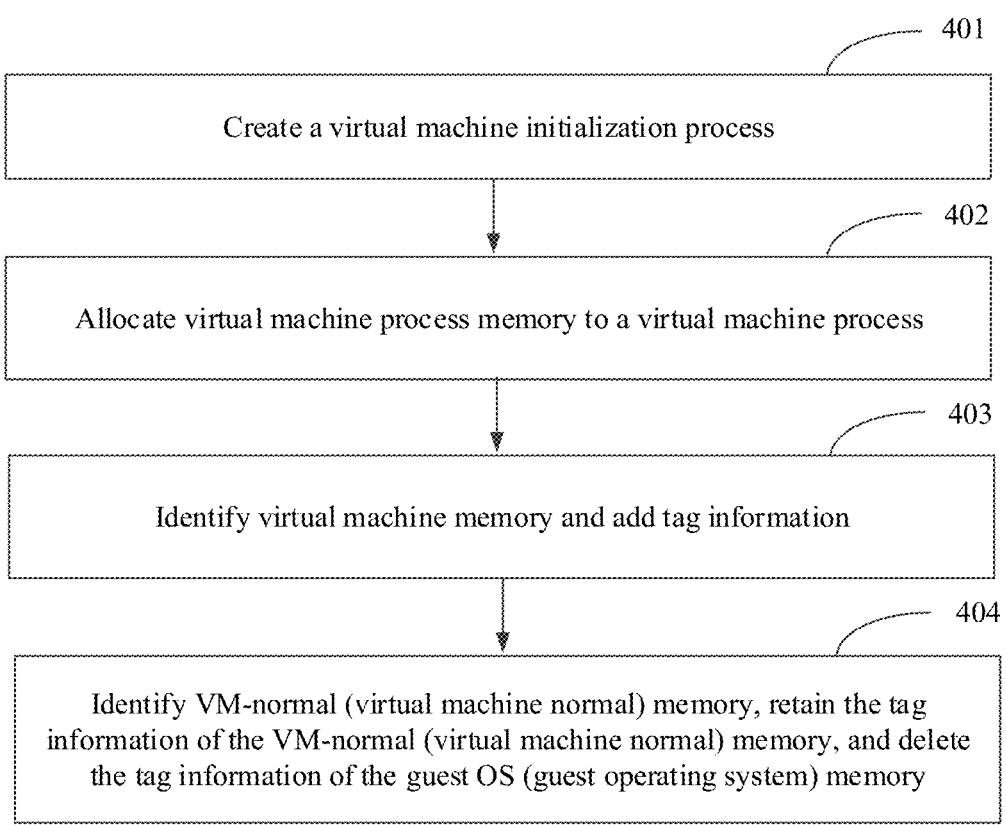
FIG. 8 is a schematic flowchart of still another virtual machine memory management method according to an embodiment of this application.

Referring to FIG. 7, in an embodiment, a virtual machine initialization module 110 may be further provided in the hypervisor on the physical host 100 on a basis of the system architecture described in FIG. 5. In some embodiments, a processor (e.g., CPU) may run the virtual machine initialization module 110, the virtual machine process memory allocation module 101, the virtual machine memory identification module 1021, and the non-guest OS memory identification module 1022 that are in the hypervisor, and the guest OS memory identification modules in the guest OSs of the VMs, to perform a virtual machine memory management method shown in FIG. 8. The method applies in a startup phase of a virtual machine, and includes but is not limited to the following operations.

S401: The virtual machine initialization module 110 creates a virtual machine initialization process.

S402: The initialization module calls the virtual machine process memory allocation module 101 and allocates required memory, that is, the virtual machine process memory described in the embodiments of this application, to the virtual machine process by using the virtual machine process memory allocation module 101. The hypervisor is used to coordinate shared access performed by virtual machines to these hardware resources such as memory, a CPU, a network adapter, and a magnetic disk. When the virtual machines start up, each virtual machine has data that needs to be stored, such as a corresponding data structure and buffered data. Therefore, to create a virtual machine, virtual machine memory and hypervisor management memory need to be allocated. That is, the virtual machine process memory includes the hypervisor management memory and the virtual machine memory.

S403: The virtual machine memory identification module 1021 identifies the virtual machine memory from the allocated virtual machine process memory and adds tag information to the virtual machine memory. The tag information herein is temporarily used as a swappable memory tag.

For example, when a virtual machine starts up, the initialization module 110 calls the virtual machine process memory allocation module 101 to allocate required memory to the virtual machine process. When the virtual machine is initialized, no memory has the swappable memory tag. The virtual machine memory identification module 1021 adds a memory filter to a memory allocation procedure. The memory filter may be a memory filtering algorithm. The memory filter determines memory purposes of different memory segments in the memory allocated to the VM, where the memory purposes include being used by the VM and being used by the hypervisor. The memory filter classifies the memory segments based on the memory purposes, and identifies all memory segments that are to be used by the VM as the virtual machine memory. A QEMU is used as an example. The QEMU is an emulation processor, written by Fabrice Bellard, that distributes source code under a general public license (GPL). The QEMU emulates a plurality of memory devices: a device memory module (e.g., pc.ram), a memory inline storage module (e.g., memdimm), and a memory node (e.g., ram-node). An actual memory segment may be configured for all the several memory devices and provided to a virtual machine for use. Therefore, the memory filter identifies all of the memory segments configured for the several memory devices, as the virtual machine memory. Further, the virtual machine memory identification module 1021 adds the swappable tag, that is, the tag information, to the identified virtual machine memory by using madvise representing a system call interface. In this case, remaining untagged memory is critical memory, that is, belongs to the hypervisor management memory, for which swapping is not allowed. In this way, the hypervisor management memory is distinguished from the virtual machine memory.

In this way, the tag information is added to both memory pages corresponding to guest OS memory and memory pages corresponding to VM-normal memory in the virtual machine memory. The tag information may be, for example, a tag such as a flag bit, a label, or an identification code, and is not limited in this application.

Memory other than the virtual machine memory in the virtual machine process memory is the hypervisor management memory. The hypervisor management memory does not have the tag information, that is, the hypervisor management memory belongs to non-swappable memory. Therefore, after S403 is performed, the hypervisor management memory can be not only quickly distinguished from the virtual machine memory but also protected, thereby improving identification efficiency and preventing the hypervisor management memory from being subsequently swapped out.

S404: After the initialization of the virtual machine is completed and startup of a guest OS of the VM is completed, a guest OS memory identification module 104 in the guest OS may query for memory usage in the guest OS, to be specific, attempt to apply for free memory, and identify free memory that is in the guest OS and that currently can be applied for, to obtain memory addresses of all the free memory. The free memory is memory that is in the virtual machine memory and that does not yet establish a mapping relationship with a memory page in physical memory (that is, no memory page is actually allocated). The guest OS memory identification module 104 notifies the non-guest OS memory identification module 1022 in the hypervisor of the memory addresses of the free memory. The non-guest OS memory identification module 1022 determines the free memory as the VM-normal memory and retains the tag information of the VM-normal memory, which is used as swappable memory. In this case, memory other than the VM-normal memory in the virtual machine memory is the guest OS memory, that is, memory that remains in the virtual machine memory and that cannot be applied for is the guest OS memory. In this way, the guest OS memory is distinguished from the VM-normal memory in the virtual machine memory. The non-guest OS memory identification module 1022 deletes the tag information of the guest OS memory. Then, the guest OS memory changes to non-swappable memory.

Therefore, after S404 is performed, the guest OS memory can be not only quickly distinguished from the VM-normal memory but also protected, thereby improving identification efficiency and preventing the guest OS memory from being subsequently swapped out.

It can be learned that when this embodiment of this application is implemented, memory (that is, the VM-normal memory) for which page swapping may be finally performed can be identified, and the tag information used as the swappable tag can be retained in the startup phase of the virtual machine, thereby distinguishing the swappable memory from the non-swappable memory. When the physical memory of a system is insufficient, only the swappable memory with the tag information may be swapped to a magnetic disk, whereas the non-swappable memory without the tag information is not swapped to a magnetic disk. This ensures that swapping is not performed for the critical memory (the hypervisor memory and the guest OS memory), prevents the virtual machine from waiting for data access for a long time when the memory is tight, avoids sharp fluctuations in performance and a stability problem, and guarantees performance of the virtual machine. This also helps improve a reuse rate of the memory in the virtual machine system by further increasing a quantity of virtual machines, thereby greatly improving users' use experience.

Figure 9:
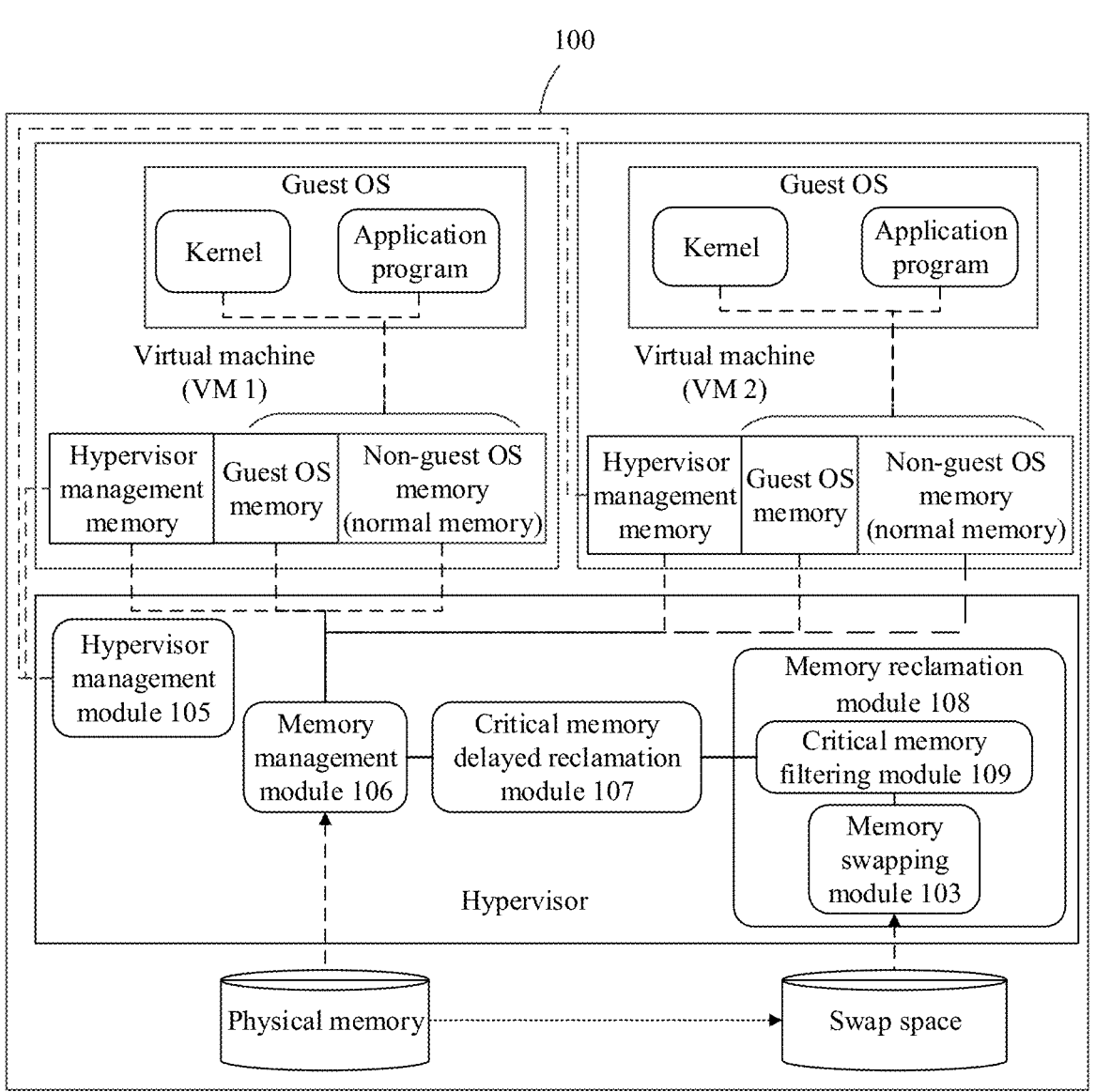
FIG. 9 is a schematic diagram of an architecture of still another device implementing a virtual machine memory management method according to an embodiment of this application.
Figure 10:
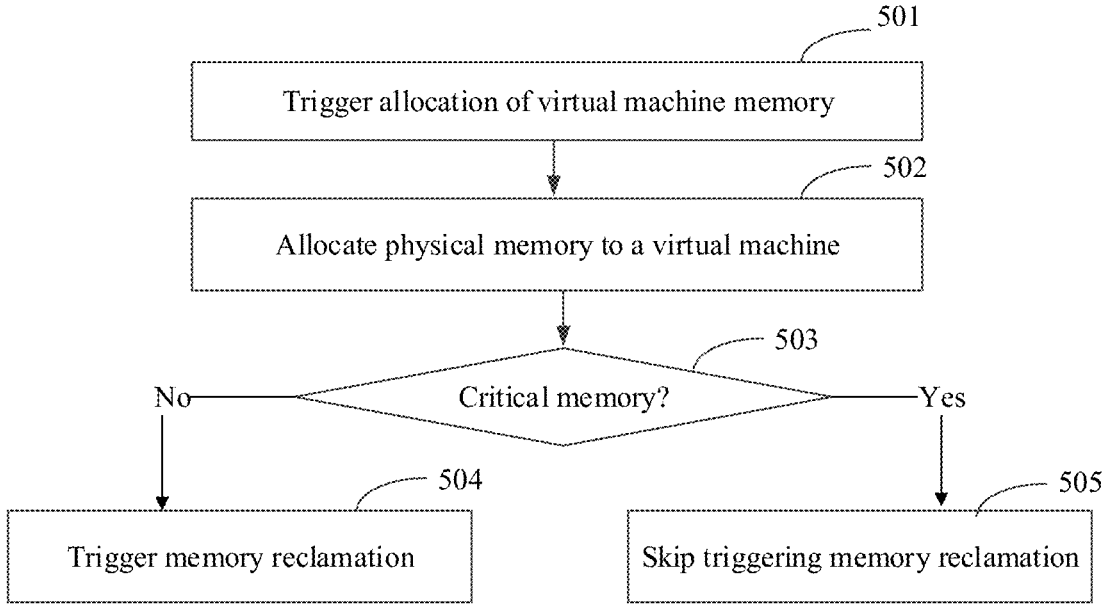
FIG. 10 is a schematic flowchart of still another virtual machine memory management method according to an embodiment of this application.

Referring to FIG. 9, in an embodiment, a memory management module 106, a critical memory delayed reclamation module 107, and a memory reclamation module 108 may be further provided in the hypervisor on the physical host 100 on a basis of the system architecture described in FIG. 5 or FIG. 7. The memory reclamation module 108 may include a critical memory filtering module 109 and the memory swapping module 103. In some embodiments, the processor (e.g., CPU) may run the memory management module 106, the critical memory delayed reclamation module 107, and the memory reclamation module 108 in the hypervisor, to perform a virtual machine memory management method shown in FIG. 10. The method applies in a running phase of a virtual machine, and includes but is not limited to the following operations.

S501: The memory management module 106 detects that a virtual machine currently needs to apply for allocation of actual physical memory.

The operating system of the physical host usually allocates actual physical memory to a virtual machine in a dynamical physical memory allocation manner. In other words, in a startup phase of the virtual machine, the operating system of the physical host allocates virtual machine process memory to the virtual machine. The virtual machine process memory may be considered as a virtual machine memory specification or virtual memory. That is, the operating system does not actually establish mapping relationships between all the virtual machine process memory and pages in the physical memory. For example, if the virtual machine process memory is 4 GB, it does not mean that a capacity of 4 GB is actually allocated to the virtual machine from the physical memory after the virtual machine starts up. When the virtual machine actually needs to use memory during running, the operating system then actually allocates real physical memory pages to the virtual machine based on an application of the virtual machine.

For example, in some scenarios, the memory management module 106 may determine, based on at least one of the following events, that the virtual machine currently needs to apply for allocation of new memory: A hypervisor management module in a virtual machine process applies for new management memory; or a kernel of a guest OS of the VM needs to access virtual machine memory for which physical memory is not actually allocated; or an application program in a guest OS of the VM needs to access virtual machine memory for which physical memory is not actually allocated; or the like. As such, S502 is triggered to perform allocation of the virtual machine memory.

S502: The memory management module 106 executes a process of allocating a new physical memory page to the virtual machine.

S503: The memory management module 106 determines whether a memory type of currently allocated new physical memory is critical memory. For example, if the currently allocated new physical memory belongs to hypervisor memory or guest OS memory, the currently allocated new physical memory is the critical memory, and operation S505 is subsequently triggered; or if the currently allocated new physical memory belongs to VM-normal memory, the currently allocated new physical memory is not the critical memory, and operation S504 is subsequently triggered.

S504: When the memory is insufficient or tight, the memory reclamation module 108 triggers a memory reclamation operation for current physical memory allocation, to obtain more free physical memory pages in the physical memory for actual memory allocation.

Usually, when the physical memory is tight, to provide sufficient memory for a new physical memory application, the virtual machine system triggers a memory reclamation operation. A memory reclamation manner includes manners such as memory swapping and memory page discarding.

For memory swapping, the memory reclamation module 108 filters out some memory pages and stores data on these memory pages into swap space in a magnetic disk, so that these memory pages free up storage space for reallocation.

In an embodiment, the critical memory filtering module 109 in the memory reclamation module 108 filters memory pages obtained from a memory reclamation procedure, and allows memory swapping to be performed only for memory pages with tag information (e.g., a swappable memory tag). Then, the memory swapping module 103 swaps filtered-out memory to the swap space in the magnetic disk, to free up physical memory space. It can be learned based on the foregoing descriptions that memory swapping is performed only for some memory pages corresponding to the VM-normal memory. By using a memory reclamation method, memory occupation can be optimized, and operating performance of the virtual machine system can be improved.

S505: The critical memory delayed reclamation module 107 does not trigger memory reclamation for current physical memory allocation.

Because a memory reclamation operation takes a long time, a memory application operation takes an excessively long time, that is, allocation of new memory is slow. This easily causes occurrence of stability and performance problems in the system. For example, for the new management memory applied for by the hypervisor management module, when memory reclamation is completed, global performance is greatly affected, and even a severe stability problem is caused.

In an embodiment of this application, with the critical memory delayed reclamation module 107, the virtual machine may be allowed to temporarily break a constraint of the memory specification to obtain a small amount of memory, to complete new allocation of the physical memory, and memory reclamation is not triggered for current physical memory allocation. As such, this helps speed up allocation of new memory pages of the critical memory, and guarantees stability and performance of the system.

For example, in physical memory (for example, 100 GB), a small amount (100 MB) of available memory space may be additionally set as a cache. When reclamation of the critical memory needs to be delayed, the virtual machine may be allowed to temporarily break a constraint of the memory specification, to obtain an appropriate amount of memory space from the cache of 100 MB for physical memory allocation.

It should be noted that the foregoing example is merely used to explain this application rather than to limit it.

It can be learned that when this embodiment of this application is implemented, when allocation of new physical memory is applied for in a running phase of the virtual machine, different operations may be performed for the critical memory (for example, the hypervisor memory or the guest OS memory) and the non-critical memory (for example, the VM-normal memory) in memory reclamation. To be specific, for the non-critical memory, a memory reclamation operation may be triggered, to optimize memory occupation and improve the operating performance of the virtual machine system. For the critical memory, no memory reclamation operation is triggered during physical memory allocation (that is, allowing delayed triggering of memory reclamation for the critical memory), thereby improving a memory allocation speed, avoiding, when the memory is tight, a performance fluctuating problem that results from the management memory being swapped, improving reliability and stability of the system, and guaranteeing users' use experience.

For a better understanding of the solutions of this application, the following describes the solutions by using a cloud computing scenario of virtual machine over-submission (or referred to as memory over-submission) as an example. Through memory over-submission, more VMs can be created by using a virtualization platform on each physical host, utilization of memory resources of the physical hosts can be improved, and memory costs can be reduced. The solutions of this application can ensure the performance and reliability of the virtual machine when memory swapping is performed for the memory of the virtual machine.

Figure 11:
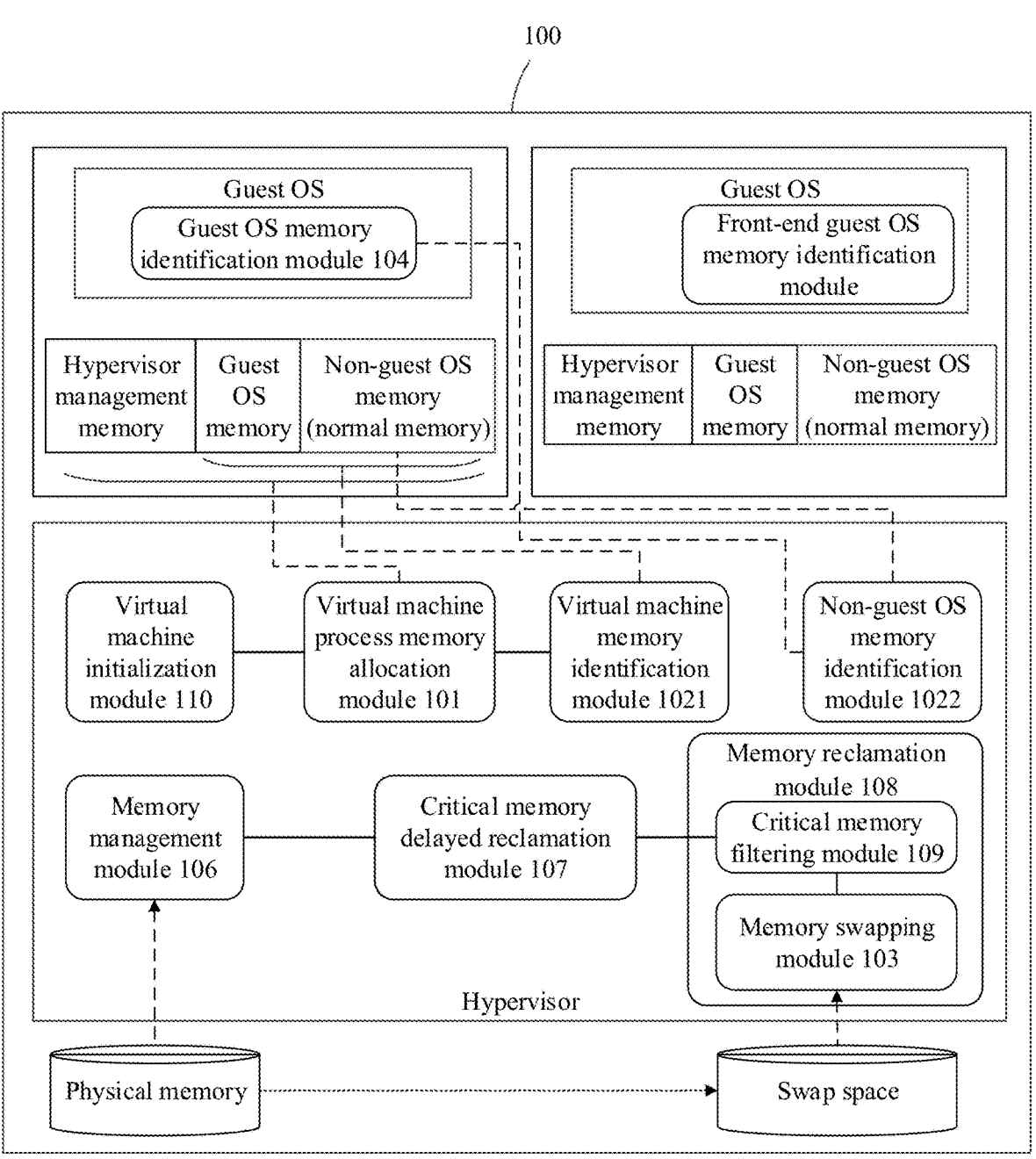
FIG. 11 is a schematic diagram of an architecture of still another device implementing a virtual machine memory management method according to an embodiment of this application.

Referring to FIG. 11, the solutions in this embodiment of this application may be implemented on a basis of the system architecture described in FIG. 5, FIG. 7, or FIG. 9. As shown in FIG. 11, the following modules may be all provided in the hypervisor on the physical host: the virtual machine initialization module 110, the virtual machine process memory allocation module 101, the virtual machine memory identification module 1021, the non-guest OS memory identification module 1022, the memory management module 106, the critical memory delayed reclamation module 107, and the memory reclamation module 108. The memory reclamation module 108 may include the critical memory filtering module 109 and the memory swapping module 103. In addition, a guest OS memory identification module is provided in a guest OS of each VM. In the cloud computing scenario, virtual machine over-submission may be dynamically configured by using a software interface, and performance and reliability can be guaranteed in a virtual machine over-submission scenario. In some embodiments, the processor (CPU) may run the functional modules in the hypervisor and the VMs to perform a virtual machine memory management method shown in FIG. 12. The method includes but is not limited to the following operations.

S601: Configure a virtual machine over-submission function by using a function switch.

In an embodiment, a sum of memory specifications of all virtual machines is allowed to exceed a size of physical memory of the physical host only after the function switch is turned on, to implement memory over-submission. For example, in a virtual machine over-submission scenario, a size of physical memory is 100 GB, and after the function switch is turned on, ten VMs can be started on a physical host, and memory allocated to each VM is of 20 GB. In this case, a sum of the specifications of the virtual machines is 200 GB, exceeding the size of the actual physical memory.

It should be noted that the foregoing example is merely used to explain the concept rather than to limit it.

S602: After memory over-submission is enabled and when a virtual machine starts up, the virtual machine initialization module 110 calls the virtual machine process memory allocation module 101 and allocates required memory, that is, virtual machine process memory, to a virtual machine process by using the virtual machine process memory allocation module 101.

S603: The virtual machine memory identification module 1021 may identify the virtual machine process memory into two categories: virtual machine memory and hypervisor management memory.

Tag information is added to the virtual machine memory. The tag information is used as a tag of swappable memory. In this way, the tag information is added to both memory pages corresponding to guest OS memory and memory pages corresponding to VM-normal memory in the virtual machine memory. The tag information may be, for example, a tag such as a flag bit, a label, or an identification code, and is not limited in this application.

The tag information is not added to the hypervisor management memory. That is, the hypervisor management memory belongs to non-swappable memory. In this way, the hypervisor management memory is protected and prevented from being subsequently swapped out.

In an embodiment, when the virtual machine is initialized, no memory page may be set to have tag information. In this case, the virtual machine memory identification module 1021 identifies the allocated virtual machine memory. For details, refer to the descriptions of operation S403. Details are not described herein again.

S604: Identify the VM-normal memory, retain the tag information of the VM-normal memory, and delete the tag information of the guest OS memory.

In an embodiment, the non-guest OS memory identification module 1022 in the hypervisor and the guest OS memory identification module in the guest OS may cooperate with each other to further identify the virtual machine memory into two categories: the VM-normal memory and the guest OS memory. The tag information of the guest OS memory is deleted, so that page swapping is not performed for the guest OS memory, whereas the tag information of the VM-normal memory is still retained, that is, the VM-normal memory is used as the swappable memory. For details, refer to the descriptions of operation S404. Details are not described herein again.

S605: In a running phase of the virtual machine, when the physical memory is insufficient and memory swapping needs to be performed, perform memory swapping for the swappable memory.

In an embodiment, when the physical memory is tight and swapping needs to be performed, memory swapping needs to be performed between some memory pages of the VM-normal memory with the tag information and swap space, for example, swapping the memory pages to a magnetic disk, whereas memory swapping is not performed for critical memory without the tag information.

In an example, that the physical memory is tight means that a ratio of available memory pages remaining in the physical memory to total memory pages in the physical memory reaches or exceeds a preset threshold. For example, the preset threshold may be set to 5%, 10%, 20%, or the like. This is not limited in this application.

In still another example, that the physical memory is tight means that the physical memory is in a full load state. In this case, there is no or nearly no free memory page in the physical memory for storing information.

S606: In the running phase of the virtual machine, execute memory allocation and memory reclamation policies based on the specified tag information.

In an embodiment, through cooperation between the memory management module 106, the critical memory delayed reclamation module 107, and the memory reclamation module 108, when the physical memory is tight, memory allocation triggered by the critical memory (for example, the hypervisor memory or the guest OS memory) without the tag information is immediately executed without triggering memory reclamation, whereas non-critical memory (for example, the VM-normal memory) with the tag information triggers memory reclamation while triggering memory allocation, and memory allocation is performed only after memory reclamation is performed. For a specific implementation process, refer to the descriptions of operations S502 to S505. Details are not described herein again.

It can be learned that when this embodiment of this application is implemented, the non-critical memory (that is, the VM-normal memory) can be identified, and the tag information used as the swappable tag can be retained in a startup phase of the virtual machine in the cloud computing scenario of virtual machine over-submission. Remaining memory is the critical memory, and the critical memory does not have the tag information. Memory swapping is allowed only for the non-critical memory subsequently. To be specific, when the physical memory of a system is insufficient, only the non-critical memory with the tag information may be swapped to a magnetic disk, whereas the critical memory without the tag information is not swapped to a magnetic disk. This ensures that swapping is not performed for the critical memory (e.g., the hypervisor memory and the guest OS memory), prevents the virtual machine from waiting for data access for a long time when the memory is tight, avoids sharp fluctuations in performance and a stability problem, and guarantees performance of the virtual machine. A memory reclamation procedure is modified, and delayed triggering of memory reclamation is allowed for the critical memory, thereby speeding up allocation of the critical memory and ensuring stability and reliability of the system. In addition, when this application is implemented, a reuse rate of the memory in the virtual machine system can be significantly improved by increasing a quantity and specifications of virtual machines, and memory costs can be reduced, thereby greatly improving users' use experience and bringing greater commercial value.

It should be noted that, for convenience, the foregoing method embodiments are expressed as a combination of a series of action operations. However, a person skilled in the art should understand that specific implementations of the technical solutions of this application are not limited to a sequence of the described series of action operations.

Figure 13:
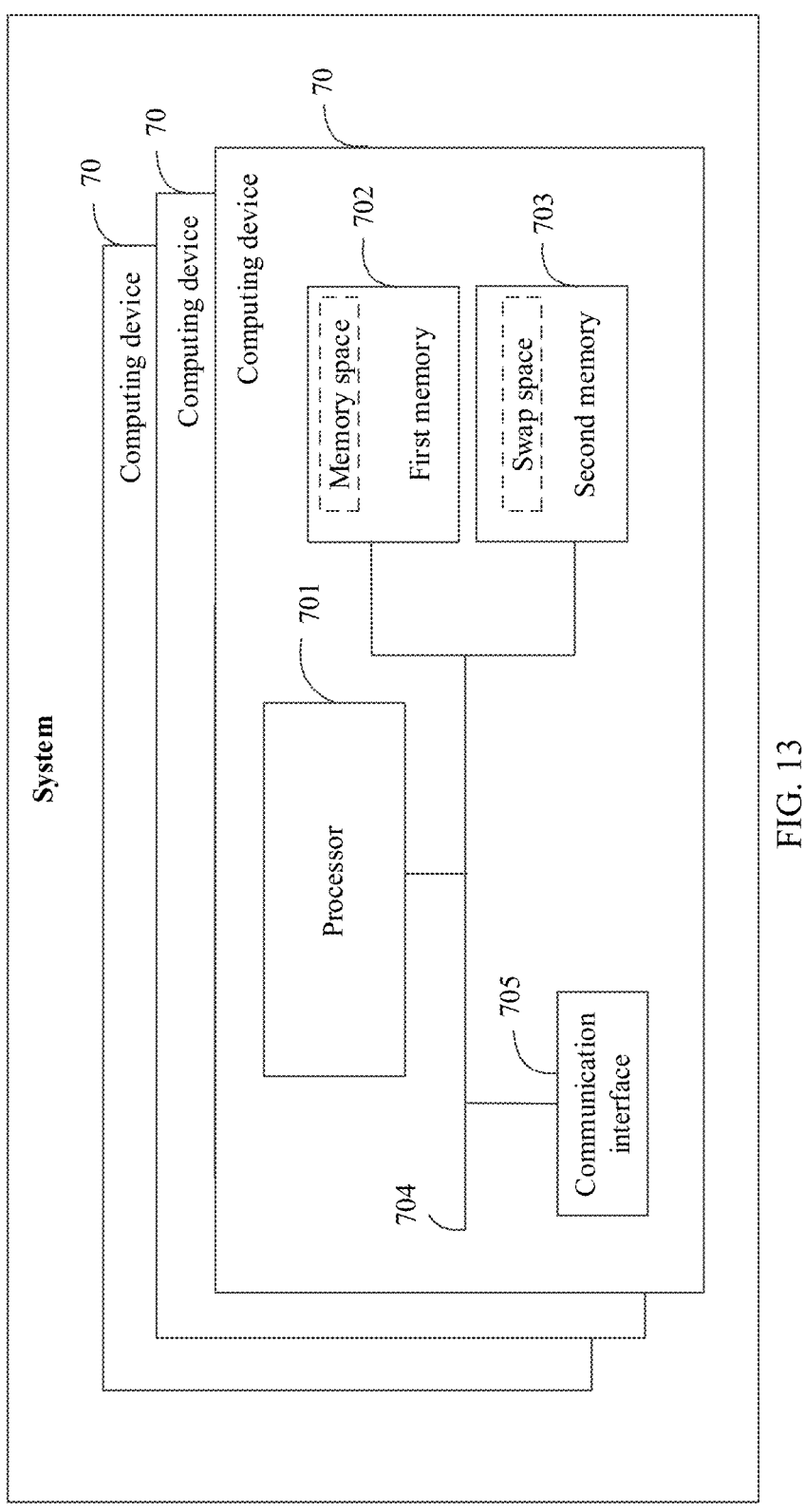
FIG. 13 is a schematic diagram of a structure of a system according to an embodiment of this application.

FIG. 13 is a schematic diagram of a structure of a system according to an embodiment of this application. The system includes one or more computing devices 70. Each computing device 70 includes a processor 701, a first memory 702, a second memory 703, and a communication interface 503. The processor 701, the first memory 702, the second memory 703, and the communication interface 503 are connected through a bus 504.

There is one or more first memories 702. The first memory 702 is configured to provide physical memory, and may be a volatile memory such as a DDR SDRAM, an SRAM, or a RAM.

There is one or more second memories 703. The second memory 703 is configured to provide swap space, to implement memory swapping between the physical memory in the first memory 702 and the swap space. The second memory 703 may be a nonvolatile memory such as a read-only memory (ROM), a flash memory, a hard disk drive (HDD) or a solid-state drive (SSD), or a magnetic disk.

The first memory 702 and/or the second memory 703 may be further configured to store a group of program code, so that the processor 701 invokes the program code to implement the virtual machine memory management method described in the foregoing embodiments.

In specific implementation, code instructions and relevant data of the functional modules described in FIG. 5, FIG. 7, FIG. 9, or FIG. 11 may be stored in memories in different computing devices 70, may be stored in a same memory in a same computing device 70, or may be stored in different memories (for example, a first memory 702 and a second memory 703) in a same computing device.

The processor 701 may include one or more general-purpose processors, for example, a central processing unit (CPU). The processor 701 may be configured to run the code instructions and the relevant data of the functional modules described in FIG. 5, FIG. 7, FIG. 9, or FIG. 11. In other words, by executing the program code, the processor 701 can implement specific functions of the functional modules described in FIG. 5, FIG. 7, FIG. 9, or FIG. 11 and implement the virtual machine memory management method in the embodiments of this application.

In an embodiment, the system further includes the communication interface 503. The communication interface 503 may be a wired interface (for example, an Ethernet interface) or a wireless interface (for example, a cellular network interface or a wireless local area network interface), and is configured to communicate with a terminal or a server, to provide a related virtual machine service to a user.

In actual application, the system may further include more or fewer components. This is not limited herein. For specific functions of the different components of the system and implementation processes, refer to the foregoing descriptions. Details are not described herein again.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, all or some of the procedures or functions are generated according to the embodiments of this application. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, a magnetic tape), an optical medium (for example, a DVD), a semiconductor medium (for example, a solid-state drive), or the like.

In the foregoing embodiments, the descriptions in each embodiment have respective focuses. For a part that is not described in detail in an embodiment, refer to related descriptions in other embodiments.

What is claimed is:

1. A method for managing virtual machine memory, the method comprising:

identifying, by a processor, memory of a non-operating system of a virtual machine from total memory allocated to the virtual machine, wherein the total memory comprises memory of the virtual machine and management memory of a hypervisor, and the memory of the virtual machine comprises memory of an operating system of the virtual machine and the memory of the non-operating system of the virtual machine;

designating, by the processor, the memory of the non-operating system of the virtual machine as swappable memory representing memory for which memory swapping is allowed, including:

identifying, by the processor, the memory of the non-operating system of the virtual machine from the memory of the virtual machine, adding, by the processor, tag information to both the memory of the operating system of the virtual machine and the memory of the non-operating system of the virtual machine, wherein the tag information indicates that memory swapping is allowed for data in the tagged memory, deleting, by the processor, the tag information of the memory of the operating system of the virtual machine, and retaining, by the processor, the tag information of the memory of the non-operating system of the virtual machine, wherein the memory of the non-operating system of the virtual machine can be distinguished from other memory including the management memory of the hypervisor and the memory of the operating system of the virtual machine, wherein the memory of the non-operating system of the virtual machine is memory other than memory of the operating system of the virtual machine in the memory of the virtual machine; and in response to determining, by the processor, that a ratio of available memory pages remaining in physical memory of a physical host to total memory pages in the physical memory reaches a preset threshold, storing, by the processor, data in the swappable memory into a nonvolatile memory, wherein the swappable memory is part of the memory of the non-operating system of the virtual machine, wherein storing data in the swappable memory into a nonvolatile memory comprises: storing, by the processor, data in the memory with the tag information into the nonvolatile memory.

2. The method according to claim 1, wherein the identifying memory of the non-operating system of the virtual machine from total memory allocated to the virtual machine comprises:

identifying, by the processor, the memory of the virtual machine from the total memory allocated to the virtual machine; and identifying, by the processor, the memory of the non-operating system of the virtual machine from the memory of the virtual machine as the swappable memory, wherein when physical memory is insufficient, the memory swapping is allowed only for the swappable memory.

3. The method according to claim 2, wherein identifying the memory of the virtual machine from the total memory allocated to the virtual machine comprises:

determining, by the processor, memory purposes of different memory segments in the total memory allocated to the virtual machine, wherein the memory purposes comprise being used by the virtual machine and being used by the hypervisor; and designating, by the processor, all memory segments to be used by the virtual machine as the memory of the virtual machine.

4. The method according to claim 2, wherein identifying the memory of the non-operating system of the virtual machine from the memory of the virtual machine as the swappable memory comprises:

applying, by the processor, for free memory in the memory of the virtual machine to obtain memory addresses of all the free memory;

designating, by the processor, memory corresponding to the memory addresses of all the free memory as the memory of the non-operating system of the virtual machine; and designating, by the processor, the memory of the non-operating system of the virtual machine as the swappable memory.

5. The method according to claim 2, wherein identifying the memory of the virtual machine from the total memory allocated to the virtual machine comprises:

identifying, by the processor during a startup phase of the virtual machine, the memory of the virtual machine from the total memory allocated to the virtual machine; and wherein identifying the memory of the non-operating system of the virtual machine from the memory of the virtual machine as the swappable memory comprises:

identifying, by the processor, the memory of the non-operating system of the virtual machine from the memory of the virtual machine as the swappable memory in a running phase after the virtual machine starts up.

6. The method according to claim 1, wherein the storing data in the swappable memory into the nonvolatile memory comprises:

when physical memory of a physical host in which the virtual machine is located is in a full load state, storing, by the processor, the data in the swappable memory into a nonvolatile memory, wherein the full load state indicates that the physical memory has no free space for storing a new memory page.

7. The method according to claim 1, wherein the method further comprises:

in response to determining that the virtual machine applies for memory allocation, determining, by the processor, a memory type of memory to be allocated; and when the memory type indicates the management memory of the hypervisor or the memory of the operating system of the virtual machine, skipping triggering memory reclamation, or when the memory type indicates the memory of the non-operating system of the virtual machine, triggering, by the processor, memory reclamation.

8. A device for managing virtual machine memory, comprising: a processor; a memory storing a computer program, which when executed by the processor, causes the processor to perform a virtual machine memory management method, the method comprising:

identifying memory of a non-operating system of a virtual machine from total memory allocated to the virtual machine, wherein the total memory comprises memory of the virtual machine and management memory of a hypervisor, and the memory of the virtual machine comprises memory of an operating system of the virtual machine and the memory of the non-operating system of the virtual machine;

designating the memory of the non-operating system of the virtual machine as swappable memory, wherein the swappable memory represents memory for which memory swapping is allowed, including:

identifying, by the processor, the memory of the non-operating system of the virtual machine from the memory of the virtual machine, adding tag information to both the memory of the operating system of the virtual machine and the memory of the non-operating system of the virtual machine, wherein the tag information indicates that memory swapping is allowed for data in the tagged memory, deleting, by the processor, the tag information of the memory of the operating system of the virtual machine, and retaining, by the processor, the tag information of the memory of the non-operating system of the virtual machine, wherein the memory of the non-operating system of the virtual machine can be distinguished from other memory including the management memory of the hypervisor and the memory of the operating system of the virtual machine, wherein the memory of the non-operating system of the virtual machine is memory other than memory of the operating system of the virtual machine in the memory of the virtual machine; and in response to determining that a ratio of available memory pages remaining in physical memory of a physical host in which the virtual machine is located to total memory pages in the physical memory reaches a preset threshold, storing data in the swappable memory into a nonvolatile memory, wherein the swappable memory is part of the memory of the non-operating system of the virtual machine, wherein storing data in the swappable memory into a nonvolatile memory comprises: storing data in the memory with the tag information into a nonvolatile memory.

9. The device according to claim 8, wherein the identifying memory of the non-operating system of the virtual machine from total memory allocated to the virtual machine comprises:

identifying the memory of the virtual machine from the total memory allocated to the virtual machine; and identifying the memory of the non-operating system of the virtual machine from the memory of the virtual machine as the swappable memory, wherein when physical memory is insufficient, the memory swapping is allowed only for the swappable memory.

10. The device according to claim 9, wherein identifying the memory of the virtual machine from the total memory allocated to the virtual machine comprises:

determining memory purposes of different memory segments in the total memory allocated to the virtual machine, wherein the memory purposes comprise being used by the virtual machine and being used by the hypervisor; and designating all memory segments to be used by the virtual machine as the memory of the virtual machine.

11. The device according to claim 9, wherein identifying the memory of the non-operating system of the virtual machine from the memory of the virtual machine as the swappable memory comprises:

applying for free memory in the memory of the virtual machine to obtain memory addresses of all the free memory;

designating memory corresponding to the memory addresses of all the free memory as the memory of the non-operating system of the virtual machine; and designating the memory of the non-operating system of the virtual machine as the swappable memory.

12. The device according to claim 9, wherein the identifying the memory of the virtual machine from the total memory allocated to the virtual machine comprises:

identifying, in a startup phase of the virtual machine, the memory of the virtual machine from the total memory allocated to the virtual machine; and the identifying the memory of the non-operating system of the virtual machine from the memory of the virtual machine as the swappable memory comprises:

identifying the memory of the non-operating system of the virtual machine from the memory of the virtual machine as the swappable memory in a running phase after the virtual machine starts up.

13. The device according to claim 8, wherein the storing data in the swappable memory into the nonvolatile memory comprises:

when physical memory of a physical host in which the virtual machine is located is in a full load state, storing the data in the swappable memory into a nonvolatile memory, wherein the full load state indicates that the physical memory has no free space for storing a new memory page.

14. The device according to claim 8, wherein the method further comprises:

in response to determining that the virtual machine applies for memory allocation, determining a memory type of memory to be allocated; and when the memory type indicates the management memory of the hypervisor or the memory of the operating system of the virtual machine, skipping triggering memory reclamation, or when the memory type indicates the memory of the non-operating system of the virtual machine, triggering memory reclamation.

15. A computer device, comprising: at least one processor and a memory connected or coupled together through a bus, wherein the memory is configured to store one or more computer programs having instructions, which when executed by the at least one processor, cause the at least one processor to perform a method, the method comprising:

identifying memory of a non-operating system of a virtual machine from total memory allocated to the virtual machine, wherein the total memory comprises memory of the virtual machine and management memory of a hypervisor, and the memory of the virtual machine comprises memory of an operating system of the virtual machine and the memory of the non-operating system of the virtual machine; designating the memory of the non-operating system of the virtual machine as swappable memory, including:

identifying, by the processor, the memory of the non-operating system of the virtual machine from the memory of the virtual machine, adding tag information to both the memory of the operating system of the virtual machine and the memory of the non-operating system of the virtual machine, wherein the tag information indicates that memory swapping is allowed for data in the tagged memory, deleting, by the processor, the tag information of the memory of the operating system of the virtual machine, and retaining, by the processor, the tag information of the memory of the non-operating system of the virtual machine, wherein the memory of the non-operating system of the virtual machine can be distinguished from other memory including the management memory of the hypervisor and the memory of the operating system of the virtual machine, wherein the swappable memory represents memory for which memory swapping is allowed, wherein the memory of the non-operating system of the virtual machine is memory other than memory of the operating system of the virtual machine in the memory of the virtual machine; and in response to determining that a ratio of available memory pages remaining in physical memory of a physical host in which the virtual machine is located to total memory pages in the physical memory reaches a preset threshold, storing data in the swappable memory into a nonvolatile memory, wherein the swappable memory is part of the memory of the non-operating system of the virtual machine, wherein storing data in the swappable memory into a nonvolatile memory comprises: storing data in the memory with the tag information into a nonvolatile memory.

16. The device according to claim 15, wherein the identifying memory of the non-operating system of the virtual machine from total memory allocated to the virtual machine comprises:

identifying the memory of the virtual machine from the total memory allocated to the virtual machine; and identifying the memory of the non-operating system of the virtual machine from the memory of the virtual machine as the swappable memory, wherein when physical memory is insufficient, the memory swapping is allowed only for the swappable memory.

17. The device according to claim 15, wherein identifying the memory of the virtual machine from the total memory allocated to the virtual machine comprises:

determining memory purposes of different memory segments in the total memory allocated to the virtual machine, wherein the memory purposes comprise being used by the virtual machine and being used by the hypervisor; and designating all memory segments to be used by the virtual machine as the memory of the virtual machine.

* * * * *